(12) United States Patent
Vermani et al.

(10) Patent No.: US 9,154,363 B2
(45) Date of Patent: Oct. 6, 2015

(54) SYSTEMS AND METHODS FOR WIRELESS COMMUNICATION OF PACKETS HAVING A PLURALITY OF FORMATS

(75) Inventors: Sameer Vermani, San Diego, CA (US); Santosh P. Abraham, San Diego, CA (US); Mohammad Hossein Taghavi Nasrabadi, San Diego, CA (US); Vincent K. Jones, Redwood City, CA (US); Hemanth Sampath, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 176 days.

(21) Appl. No.: 13/466,971

(22) Filed: May 8, 2012

(65) Prior Publication Data

US 2013/0128806 A1    May 23, 2013

Related U.S. Application Data

(60) Provisional application No. 61/486,107, filed on May 13, 2011, provisional application No. 61/488,714, filed on May 21, 2011, provisional application No. 61/577,442, filed on Dec. 19, 2011, provisional application No. 61/580,613, filed on Dec. 27, 2011, provisional application No. 61/585,557, filed on Jan. 11, 2012.

(51) Int. Cl.
*H04L 29/06* (2006.01)
*H04L 1/00* (2006.01)
*H04W 80/04* (2009.01)

(52) U.S. Cl.
CPC ........ *H04L 29/06163* (2013.01); *H04L 1/0028* (2013.01); *H04L 1/0033* (2013.01);

(Continued)

(58) Field of Classification Search
CPC ..... H04W 80/04; H04W 84/12; H04W 88/06; H04W 88/08; H04W 84/18; H04W 74/08
USPC .......................... 370/252, 328, 338, 464–465
See application file for complete search history.

(56) References Cited

U.S. PATENT DOCUMENTS 7,711,061 B2    5/2010    Trachewsky
7,903,755 B2    3/2011    Mujtaba (Continued)

FOREIGN PATENT DOCUMENTS

EP    1589704 A2    10/2005
EP    2107707 A1    10/2009

(Continued)

OTHER PUBLICATIONS

"IEEE Standard for Information technology—Telecommunications and information exchange between systems—Local and metropolitan area networks—Specific requirements Part 11: Wireless LAN Medium Access Control (MAC) and Physical Layer (PHY) Specifications Amendment 5: Enhancements for Higher Throughput", IEEE Standard, IEEE, Piscataway, NJ, USA, Oct. 29, 2009, pp. C1-C502, XP017604244, ISBN: 978-0-7381-6046-7.

(Continued)

*Primary Examiner* — Warner Wong
(74) *Attorney, Agent, or Firm* — S. Hossain Beladi

(57) ABSTRACT

Systems and methods for communicating packets having a plurality of formats are described herein. In some aspects, a signal (SIG) field in the preamble of a packet may indicate whether an extension field, such as an extension SIG field or SIG-B field, is included in the packet. In another aspect, one or more detectors may be used to auto-detect packets formatted as one of at least two different formats based on a short training field (STF) of a received packet. In some aspects, along training field (LTF) in the preamble of a packet may indicate whether the payload is repetition coded.

36 Claims, 22 Drawing Sheets

(52) U.S. Cl.
CPC .......... *H04L1/0039* (2013.01); *H04L 29/0653* (2013.01); *H04L 69/18* (2013.01); *H04L 69/22* (2013.01); *H04W 80/04* (2013.01)

(56) References Cited

U.S. PATENT DOCUMENTS

| | | | |
|---|---|---|---|
| 8,009,611 B2 | 8/2011 | Tanaka | |
| 8,077,696 B2 * | 12/2011 | Izumi et al. | 370/350 |
| 8,111,608 B2 | 2/2012 | Takahashi et al. | |
| 8,149,930 B2 | 4/2012 | Nakao | |
| 8,233,462 B2 | 7/2012 | Walton et al. | |
| 8,532,213 B2 * | 9/2013 | Trachewsky | 375/267 |
| 8,660,140 B2 * | 2/2014 | Kwon et al. | 370/466 |
| 8,942,320 B2 * | 1/2015 | Zhang et al. | 375/332 |
| 2004/0218568 A1 | 11/2004 | Goodall et al. | |
| 2005/0041660 A1 | 2/2005 | Pennec et al. | |
| 2005/0135284 A1 | 6/2005 | Nanda et al. | |
| 2005/0256474 A1 | 11/2005 | Sperl et al. | |
| 2006/0193340 A1 | 8/2006 | Jones et al. | |
| 2006/0280134 A1 * | 12/2006 | Kwon et al. | 370/278 |
| 2007/0058623 A1 * | 3/2007 | Moorti et al. | 370/389 |
| 2007/0201350 A1 | 8/2007 | Papasakellariou | |
| 2008/0049707 A1 | 2/2008 | Kwon et al. | |
| 2008/0310339 A1 | 12/2008 | Kano | |
| 2009/0122694 A1 | 5/2009 | Stephens et al. | |
| 2009/0156194 A1 | 6/2009 | Meylan | |
| 2009/0305629 A1 | 12/2009 | Izumi et al. | |
| 2010/0050054 A1 | 2/2010 | Abraham et al. | |
| 2010/0080266 A1 * | 4/2010 | Zhang et al. | 375/140 |
| 2010/0309834 A1 | 12/2010 | Fischer et al. | |
| 2010/0315952 A1 * | 12/2010 | Pare et al. | 370/241 |
| 2011/0032875 A1 | 2/2011 | Erceg et al. | |
| 2011/0038441 A1 * | 2/2011 | Shi | 375/340 |
| 2011/0039541 A1 | 2/2011 | Park et al. | |
| 2011/0063991 A1 | 3/2011 | Sampath et al. | |
| 2011/0096796 A1 * | 4/2011 | Zhang et al. | 370/474 |
| 2011/0096797 A1 | 4/2011 | Zhang et al. | |
| 2011/0149927 A1 * | 6/2011 | Stacey et al. | 370/338 |
| 2011/0280232 A1 | 11/2011 | Wu et al. | |
| 2012/0163497 A1 | 6/2012 | Kim et al. | |
| 2012/0177144 A1 | 7/2012 | Lee, II et al. | |
| 2012/0269125 A1 | 10/2012 | Porat et al. | |
| 2013/0089054 A1 * | 4/2013 | Hansen et al. | 370/329 |
| 2013/0121243 A1 * | 5/2013 | Vermani et al. | 370/328 |
| 2013/0121244 A1 * | 5/2013 | Vermani et al. | 370/328 |
| 2013/0121245 A1 * | 5/2013 | Vermani et al. | 370/328 |
| 2013/0128808 A1 | 5/2013 | Wentink et al. | |
| 2013/0208607 A1 * | 8/2013 | Abraham et al. | 370/252 |
| 2014/0064223 A1 * | 3/2014 | Stephens et al. | 370/329 |
| 2014/0185695 A1 * | 7/2014 | Kenney et al. | 375/260 |
| 2015/0036567 A1 * | 2/2015 | Park et al. | 370/311 |

FOREIGN PATENT DOCUMENTS

| | | |
|---|---|---|
| JP | 2002135231 A | 5/2002 |
| JP | 2008022173 A | 1/2008 |
| JP | 2008252301 A | 10/2008 |
| JP | 2010109401 A | 5/2010 |
| JP | 2010206730 A | 9/2010 |
| TW | 200711381 | 3/2007 |
| TW | I319266 B | 1/2010 |
| WO | 0139449 A1 | 5/2001 |
| WO | WO-2005039105 A1 | 4/2005 |
| WO | 2008024321 A2 | 2/2008 |
| WO | WO-2010120692 A1 | 10/2010 |
| WO | 2010144561 A1 | 12/2010 |
| WO | 2011019968 | 2/2011 |
| WO | WO-2011050320 A1 | 4/2011 |
| WO | 2012148488 A1 | 11/2012 |
| WO | 2012158559 | 11/2012 |

OTHER PUBLICATIONS

International Search Report and Written Opinion—PCT/US2012/037638—ISA/EPO—Jun. 27, 2012.

Prepared by the 802.11 Working Group of the 802 Committee: Mar. 14, 2011, XP55029328, Three Park Avenue New York, New York 10016-5997, USA Retrieved from the Internet: URL:http://standards.ieee.org/ [retrieved on Jun. 8, 2012].

Ryuta Imashioya et al: "RTL design of 1.2Gbps MIMO WLAN system and its business aspect", Communications and Information Technology. 2009. ISCIT 2009. 9th International Symposium on, IEEE, Piscataway, NJ, USA, Sep. 28, 2009, pp. 296-301, XP031571317, ISBN: 978-1-4244-4521-9.

Beecher P., "Jan. 2008—minutes-tg4e; 15-08-0062-00-004e—Jan. 2008—minutes-tg 4e", IEEE Draft; 15-08-0062-00-004E—Jan. 2008—Minutes-TG 4E, IEEE-SA Mentor, Piscataway, NJ USA, Integration UK Ltd, vol. 802.154e, Jan. 16, 2008, pp. 1-7, XP017668447, [retrieved on Jan. 16, 2008] paragraph [8:14] paragraph [13:44].

Casado L., et al., "ContikiSec: A Secure Network Layer for Wireless Sensor Networks under the Contiki Operating System", Oct. 14, 2009, Identity and Privacy in the Internet Age, Springer Berlin Heidelberg, Berlin, Heidelberg, pp. 133-147, XP019132224, ISBN: 978-3-642-04765-7 p. 135, paragraph 2.

"Data link layer (DLL) for unified high-speed wire-line based home networking transceivers; G.9961 (06/10)", ITU-T Standard, International Telecommunication Union, Geneva; CH, No. G.9961 (06/10), Jun. 11, 2010, pp. 1-220, XP017467820, [retrieved on Jul. 22, 2011] p. 11, paragraph 2 paragraph [8.1.3.4] figure A.1 p. 209, paragraph 1-4.

International Search Report and Written Opinion—PCT/US2012/038723—ISA/EPO—Sep. 20, 2013.

Lashkari A.H., et al., "Wired Equivalent Privacy (WEP)", Future Computer and Communication, 2009 International Conference on, IEEE, Piscataway, NJ, USA, Apr. 3, 2009, pp. 492-495, XP031499558, ISBN: 978-0-7695-3591-3 p. 495, col. 2, paragraph 2.

Nanda S., et al., "High Throughput Enhancements Presentation: Features and Performance; 11-04-0873-02-000n-high-throughput-enhancements-presentation-features-and-performance", IEEE Draft; 11-04-0873-02-000N-High-Throughput-Enhancements-Presentation-Features-And-Performance, IEEE-SA Mentor, Piscataway, NJ USA, vol. 802.11n, No. 2, Sep. 16, 2004, pp. 1-53, XP017690511, [retrieved on Sep. 16, 2004] p. 9.

IEEE P802.11acTM/D2.0, Draft Standard for Information Technology—Telecommunications and Information Exchange Between Systems—LAN/MAN—Specific Requirements—Part 11: Wireless LAN Medium Access Control and Physical Layer Specifications—Amendment 4: Enhancements for Very High Throughput for Operation in Bands below 6 GHz, Mar. 14, 2011, Table 22-11 of p. 206, Table 22-1 of p. 168 and Table 22-13 of p. 215, 5 pages.

Taiwan Search Report—TW101116918—TIPO—Dec. 26, 2014.

* cited by examiner

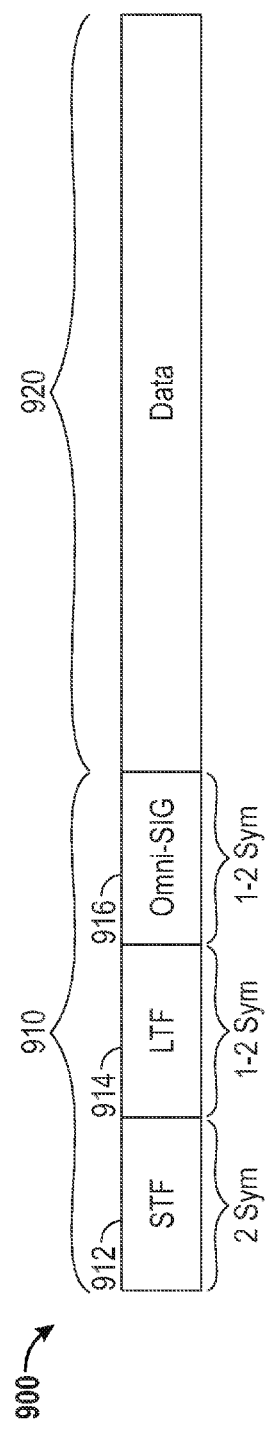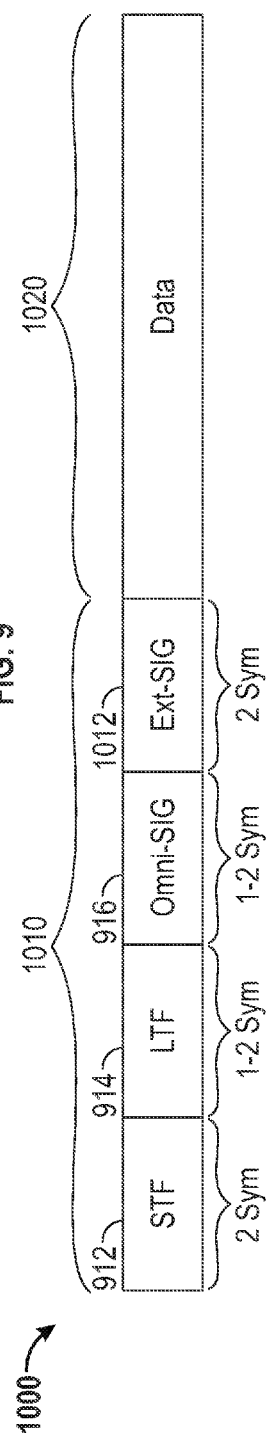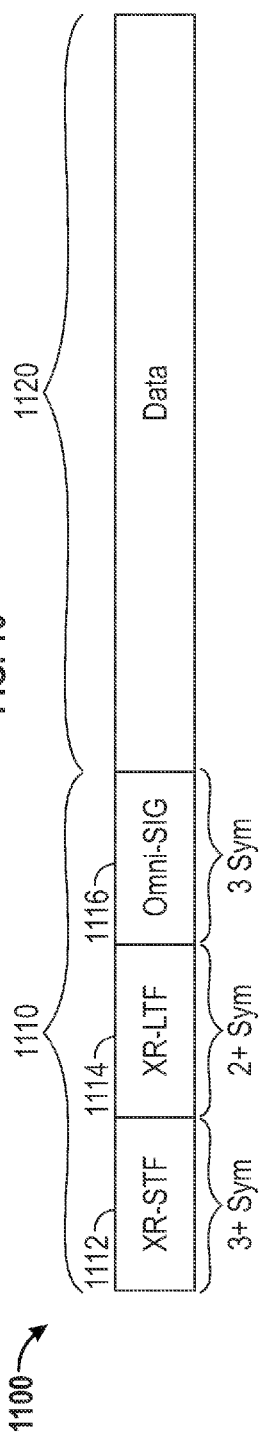

916a →

| #Bits | Omni-SIG Field |
|---|---|
| 12 | Length |
| 4 | MCS |
| 1 | BW |
| 1 | Parity |
| 2 | Reserved |
| 6 | Tail |
| 26 | Total Bits |

| #Bits | Omni-SIG Field |
|---|---|
| 12 | Length |
| 4 | MCS |
| 2 | Mode |
| 1 | SGI |
| 1 | Parity |
| 6 | Tail |
| 26 | Total Bits |

| #Bits | Omni-SIG Field (Mode 11) |
|---|---|
| 10 | Length |
| 2 | BW |
| 4 | Reserved |
| 2 | Mode |
| 1 | Parity |
| 1 | SGI |
| 6 | Tail |
| 26 | Total Bits |

| #Bits | Omni-SIG Field |
|---|---|
| 4 | Rate |
| 2 | Num SS |
| 1 | SGI |
| 18 | Length |
| 4 | CRC |
| 6 | Tail |
| 2-3 | BW |
| 1 | MU-extension |
| 1 | Aggregation |
| 11-12 | Reserved |
| 50-52 | Total Bits |

| #Bits | Ext-SIG Field |
|---|---|
| 16 | MCS×4 |
| 4 | Length |
| 1 | BW |
| 1 | SGI/LGI |
| 4 | Coding×4 |
| 8 | Num SS×4 |
| 6 | GID |
| 4 | CRC |
| 2 | Reserved |
| 6 | Tail |
| 52 | Total Bits |

FIG. 15

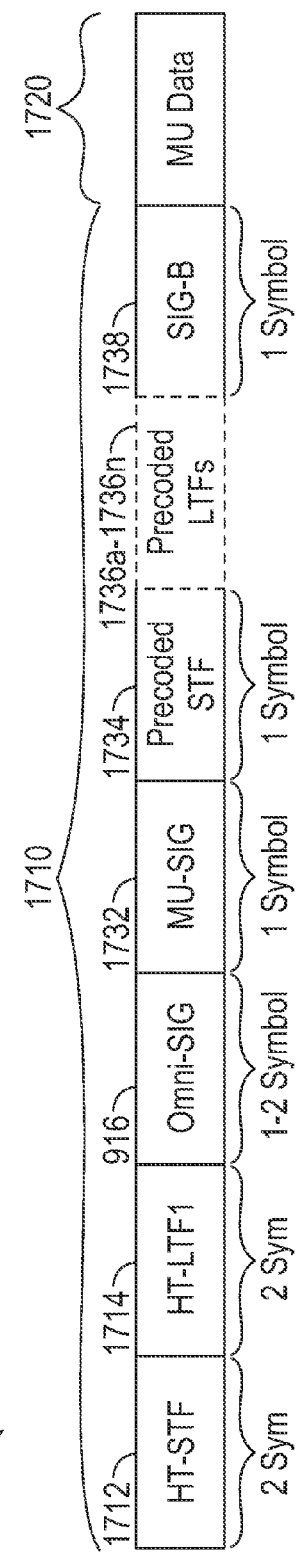

916e →

| #Bits | SIG-A Field |
|---|---|
| 4 | MCS |
| 2 | Num SS |
| 1 | SGI |
| 12 | Length |
| 2 | BW |
| 1 | Aggregation |
| 1 | Coding |
| 1 | MU |
| 1 | STBC |
| 16 | AID/GID |
| 1 | Reserved |
| 4 | CRC |
| 6 | Tail |
| 52 | Total Bits |

| #Bits | SIG-B Field |
|---|---|
| 4 | MCS |
| 1 | Coding |
| 11 | Reserved |
| 4 | CRC |
| 6 | Tail |
| 26 | Total Bits |

| #Bits | SIG-A Field |
|---|---|
| 12 | Length |
| 4 | MCS |
| 2 | BW |
| 1 | Reserved |
| 1 | Parity |
| 6 | Tail |
| 26 | Total Bits |

| #Bits | Ext-SIG Field |
|---|---|
| 12 | MCS×3 |
| 8 | Nsts |
| 1 | BF |
| 1 | SGI/LGI |
| 4 | Coding×4 |
| 1 | STBC |
| 6 | GID |
| 4 | CRC |
| 9 | Reserved |
| 6 | Tail |
| 52 | Total Bits |

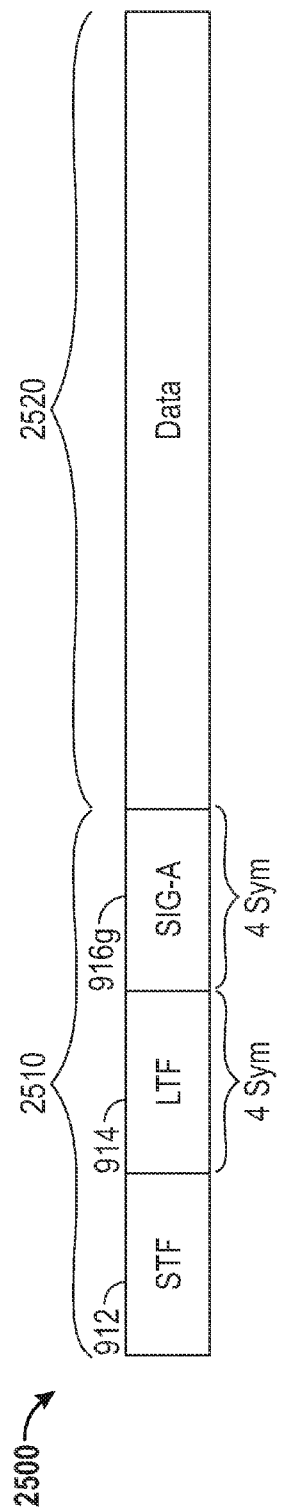
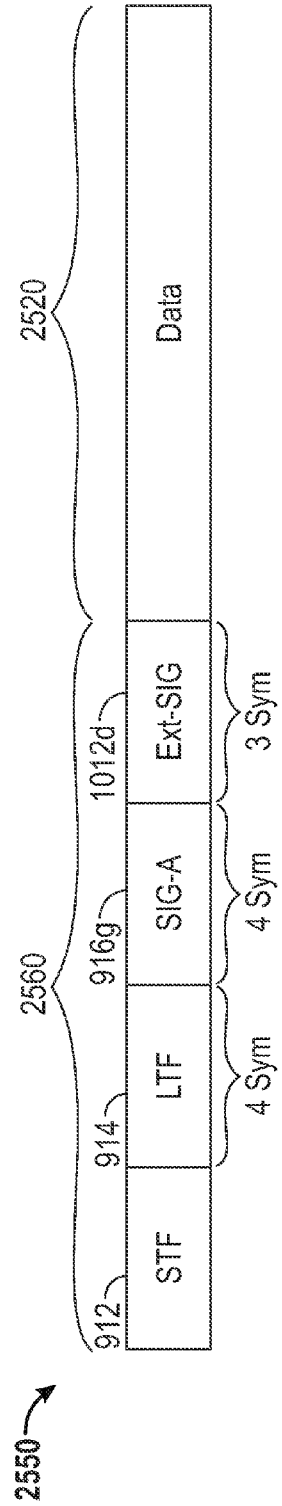
FIG. 25A
FIG. 25B

916g

| #Bits | SIG-A Field |
|---|---|
| 9 | Length |
| 4 | MCS |
| 1 | SGI |
| 4 | CRC |
| 6 | Tail |
| 24 | Total Bits |

| #Bits | Ext-SIG Field |
|---|---|
| 2 | Num SS |
| 1 | Doppler/Midamble |
| 2 | Coding |
| 5 | PAID |
| 1 | STBC |
| 1 | Parity |
| 6 | Tail |
| 18 | Total Bits |

2802 — Determine whether to include an extension field in a physical layer preamble of a communication 2804 — Generate the communication 2806 — Wirelessly transmit the generated communication

FIG. 28

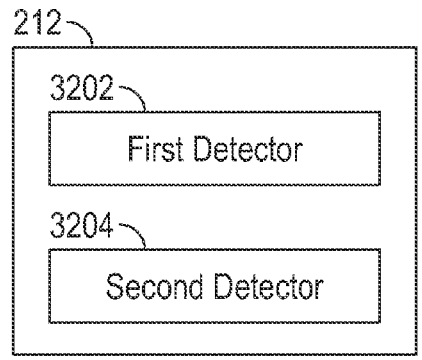
FIG. 32
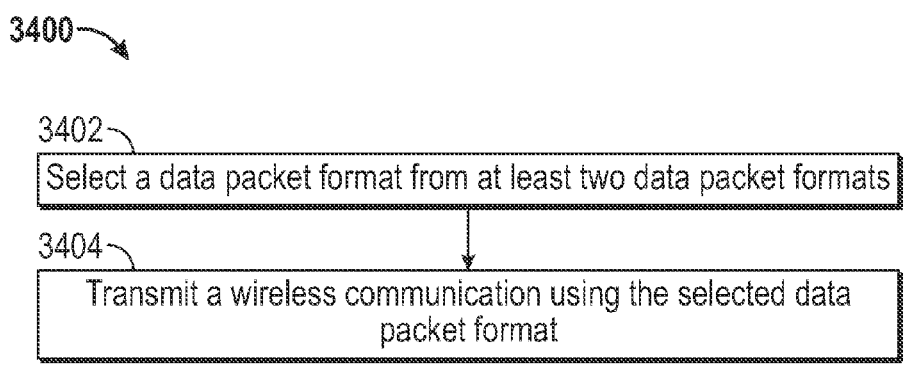
FIG. 33
FIG. 34

SYSTEMS AND METHODS FOR WIRELESS COMMUNICATION OF PACKETS HAVING A PLURALITY OF FORMATS

CROSS REFERENCE TO RELATED APPLICATIONS

This application claims benefit under 35 U.S.C. §119(e) to U.S. Provisional Patent Application No. 61/486,107 entitled "SYSTEMS AND METHODS FOR WIRELESS COMMUNICATION OF PACKETS HAVING A PLURALITY OF FORMATS" filed on May 13, 2011, the disclosure of which is hereby incorporated by reference in its entirety. This application additionally claims benefit under 35 U.S.C. §119(e) to U.S. Provisional Patent Application No. 61/488,714 entitled "SYSTEMS AND METHODS FOR WIRELESS COMMUNICATION OF PACKETS HAVING A PLURALITY OF FORMATS" filed on May 21, 2011, the disclosure of which is hereby incorporated by reference in its entirety. This application also claims benefit under 35 U.S.C. §119(e) to U.S. Provisional Patent Application No. 61/577,442 entitled "SYSTEMS AND METHODS FOR WIRELESS COMMUNICATION OF PACKETS HAVING A PLURALITY OF FORMATS" filed on Dec. 19, 2011, the disclosure of which is hereby incorporated by reference in its entirety. This application claims benefit under 35 U.S.C. §119(e) to U.S. Provisional Patent Application No. 61/580,613 entitled "SYSTEMS AND METHODS FOR WIRELESS COMMUNICATION OF PACKETS HAVING A PLURALITY OF FORMATS" filed on Dec. 27, 2011, the disclosure of which is hereby incorporated by reference in its entirety. This application claims benefit under 35 U.S.C. §119(e) to U.S. Provisional Patent Application No. 61/585,557 entitled "SYSTEMS AND METHODS FOR WIRELESS COMMUNICATION OF PACKETS HAVING A PLURALITY OF FORMATS" filed on Jan. 11, 2012, the disclosure of which is hereby incorporated by reference in its entirety.

BACKGROUND

1. Field

The present application relates generally to wireless communications, and more specifically to systems and methods for communicating packets having a plurality of different formats.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

After a packet is received, portions of the overhead or control information in a packet may be used to determine parameters for processing data carried in the packet. The packet, however, may be formatted in a plurality of ways. Accordingly, it is advantageous for a transmitting node to be able to determine which format to use for a given communication and to generate the communication. Similarly, it is advantageous for a receiving node to be able to determine the format of the packet and process the data in the packet accordingly. Thus, improved systems, methods, and devices for communicating packets having a plurality of formats are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved approaches for communicating packets having a plurality of formats.

One aspect of the disclosure provides an apparatus for wireless communication. The apparatus comprises a receiver configured to receive a wireless communication comprising a physical layer preamble and a payload. The preamble may include a first field indicating whether the preamble includes an extension field. The apparatus further comprises a processor configured to process the payload based on modulation coding parameters included in the first field when the indicator signifies that the preamble does not include the extension field, and configured to process the payload based on coding parameters included in the extension field when the indicator signifies that the preamble includes the extension field.

Another aspect of the disclosure provides a method for wireless communication. The method comprises receiving a wireless communication comprising a physical layer preamble and a payload. The preamble includes a first field indicating whether the preamble includes an extension field. The method further comprises processing the payload based on modulation coding parameters included in the first field when the indicator signifies that the preamble does not include the extension field, and processing the payload based on coding parameters included in the extension field when the indicator signifies that the preamble includes the extension field.

Another aspect of the disclosure provides an apparatus for wireless communication. The apparatus comprises means for receiving a wireless communication comprising a physical layer preamble and a payload. The preamble may include a first field indicating whether the preamble includes an extension field. The apparatus further comprises means for processing the payload based on modulation coding parameters included in the first field when the indicator signifies that the preamble does not include the extension field, and means for processing the payload based on coding parameters included in the extension field when the indicator signifies that the preamble includes the extension field.

Another aspect of the disclosure provides a computer readable medium comprising instructions that when executed cause an apparatus to receive a wireless communication comprising a physical layer preamble and a payload. The preamble may include a first field indicating whether the preamble includes an extension field. The medium further comprises instructions that when executed cause an apparatus to process the payload based on modulation coding parameters included in the first field when the indicator signifies that the preamble does not include the extension field, and process the payload based on coding parameters included in the extension field when the indicator signifies that the preamble includes the extension field.

Another aspect of the disclosure provides an apparatus for wireless communication. The apparatus comprises a processor configured to generate a communication comprising a physical layer preamble and a payload and to determine whether to include an extension field in the preamble. The preamble includes a first field indicating whether the extension field is included. The processor is configured to include modulation coding parameters for the payload in the first field when it is determined not to include the extension field, and to include coding parameters for the payload in the extension field when it is determined to include the extension field. The apparatus further comprises a transmitter configured to wirelessly transmit the generated communication.

Another aspect of the disclosure provides a method of wireless communication. The method comprises determining whether to include an extension field in a physical layer preamble of a communication, generating the communication, and wirelessly transmitting the generated communication. The communication comprises the preamble and a payload, and the preamble includes a first field indicating whether the extension field is included. The generation may comprise including modulation coding parameters for the payload in the first field when it is determined not to include the extension field, and including coding parameters for the payload in the extension field when it is determined to include the extension field.

Another aspect of the disclosure provides an apparatus for wireless communication. The apparatus comprises means for determining whether to include an extension field in a physical layer preamble of a communication, means for generating the communication, and means for wirelessly transmitting the generated communication. The communication comprises the preamble and a payload, and the preamble includes a first field indicating whether the extension field is included. The means for generating may comprise means for including modulation coding parameters for the payload in the first field when it is determined not to include the extension field, and means for including coding parameters for the payload in the extension field when it is determined to include the extension field.

Another aspect of the disclosure provides a computer readable medium comprising instructions that when executed cause an apparatus to determine whether to include an extension field in a physical layer preamble of a communication, generate the communication, and wirelessly transmit the generated communication. The communication may comprise the preamble and a payload, and the preamble may include a first field indicating whether the extension field is included. The generation may comprise including modulation coding parameters for the payload in the first field when it is determined not to include the extension field, and including coding parameters for the payload in the extension field when it is determined to include the extension field.

One aspect of the disclosure provides an apparatus for wireless communication. The apparatus comprises a receiver configured to wirelessly receive data packets having at least two formats. The receiver comprises a first detector configured to detect data packets of at least one of the two formats and a second detector configured to detect data packets of another of the two formats. The apparatus further comprises a processor configured to process a received data packet based at least in part on whether the received data packet was detected by the first detector or the second detector.

Another aspect of the disclosure provides a method for wireless communication. The method comprises wirelessly receiving a data packet having one of at least two formats, detecting a format of the received data packet using one of at least two detectors configured to detect respective data packet formats, and processing the received data packet based on the detected format.

Another aspect of the disclosure provides an apparatus for wireless communication. The apparatus comprises means for wirelessly receiving a data packet having one of at least two formats, first means for detecting whether the received data packet has a first format, second means for detecting whether the received data packet has a second format, and means for processing the received data packet based on the first detecting means an the second detecting means.

Another aspect of the disclosure provides a computer readable medium comprising instructions that when executed cause an apparatus to wirelessly receive a data packet having one of at least two formats, detect a format of the received data packet using one of at least two detectors configured to detect respective data packet formats, and process the received data packet based on the detected format.

Another aspect of the disclosure provides an apparatus for wireless communication. The apparatus comprises a processor configured to select a data packet format from at least two data packet formats comprising a training field, and a transmitter configured to transmit a wireless communication using the selected data packet format. The training field of one of the data packet formats includes a sequence repeated a greater number of times than in the training field of another of the data packet formats.

Another aspect of the disclosure provides a method of wireless communication. The method comprises selecting a data packet format from at least two data packet formats comprising a training field, and transmitting a wireless communication using the selected data packet format. The training field of one of the data packet formats includes a sequence repeated a greater number of times than in the training field of another of the data packet formats.

Another aspect of the disclosure provides an apparatus for wireless communication. The apparatus comprises means for selecting a data packet format from at least two data packet formats comprising a training field, and means for transmitting a wireless communication using the selected data packet format. The training field of one of the data packet formats includes a sequence repeated a greater number of times than in the training field of another of the data packet formats.

Another aspect of the disclosure provides a computer readable medium comprising instructions that when executed cause an apparatus to select a data packet format from at least two data packet formats comprising a training field, and transmit a wireless communication using the selected data packet format. The training field of one of the data packet formats includes a sequence repeated a greater number of times than in the training field of another of the data packet formats.

Another aspect of the disclosure provides an apparatus for wireless communication. The apparatus comprises a receiver configured to receive at least a physical layer preamble of a wireless communication. The preamble includes a first field indicating whether the preamble also includes an extension field. The apparatus further comprises a processor configured to abort reception of a remainder of the communication when the first field indicates that the preamble includes the extension field. The processor may be configured to determine whether the extension field is included based on the first field.

Another aspect of the disclosure provides a method of wireless communication. The method comprises receiving at least a physical layer preamble of a wireless communication. The preamble includes a first field indicating whether the preamble also includes an extension field. The method further comprises aborting reception of a remainder of the communication when the first field indicates that the preamble includes the extension field. The method may further comprise determining whether the extension field is included based on the first field.

Another aspect of the disclosure provides an apparatus for wireless communication. The apparatus comprises means for receiving at least a physical layer preamble of a wireless communication. The preamble includes a first field indicating whether the preamble also includes an extension field. The apparatus further comprises means for aborting reception of a remainder of the communication when the first field indicates that the preamble includes the extension field. The apparatus may further comprise means for determining whether the extension field is included based on the first field.

Another aspect of the disclosure provides a computer readable medium comprising instructions that when executed cause an apparatus to receive at least a physical layer preamble of a wireless communication. The preamble includes a first field indicating whether the preamble also includes an extension field. The instructions further cause the apparatus to abort reception of a remainder of the communication when the first field indicates that the preamble includes the extension field. The instructions may further cause the apparatus to determine whether the extension field is included based on the first field.

BRIEF DESCRIPTION OF THE DRAWINGS

FIG. 9 illustrates an example of a format of a packet having a signal field.

FIG. 10 illustrates an example of a format of a packet having a signal field and an extension field.

FIG. 11 illustrates an example of a format of a packet having a signal field.

FIG. 12 illustrates an example of the signal field of FIG. 9 or 10.

FIG. 13A illustrates an example of the signal field of FIG. 9 or 10.

FIG. 13B illustrates an example of the signal field of FIG. 9 or 10.

FIG. 14 illustrates an example of the signal field of FIG. 9 or 10.

FIG. 15 illustrates an example of the extension field of FIG. 10.

FIG. 16 illustrates an example of the extension field of FIG. 10.

FIG. 17 illustrates an example format of a packet having a signal field and an extension field.

FIG. 20 illustrates an example of a signal field in FIG. 19A or 19B.

FIG. 21 illustrates an example of a signal field in FIG. 19B.

FIG. 23 illustrates an example of a signal field of FIGS. 22A-22C.

FIG. 24 illustrates an example of a signal field of FIG. 22A or 22B.

FIGS. 25A and 25B illustrate example formats of packets having one or more signal fields.

FIG. 26 illustrates an example of a signal field of FIGS. 25A and 25B.

FIG. 27 illustrates an example of an extension field of FIGS. 25A and 25B.

FIG. 28 illustrates an aspect of a method for transmitting a packet.

FIG. 32 illustrates various example components that may be utilized in the receiver of FIG. 2.

FIG. 33 illustrates an example of the signal field of FIG. 11.

FIG. 34 illustrates an aspect of a method for transmitting a packet.

DETAILED DESCRIPTION

Figure 1:
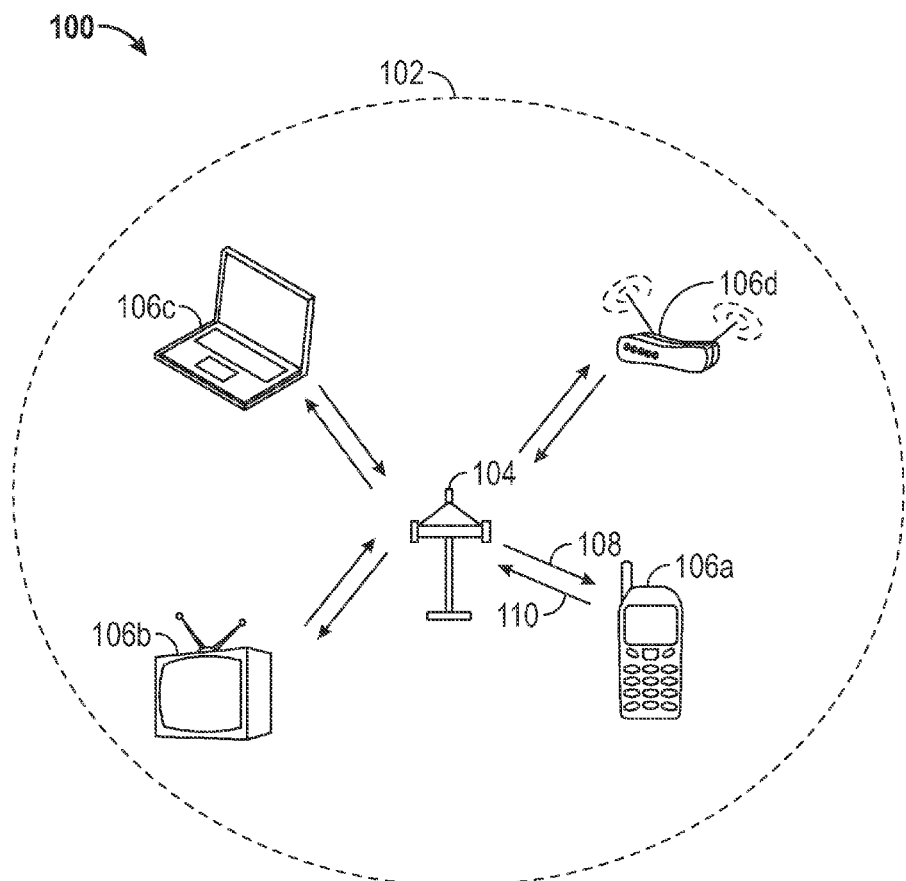
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

Certain of the devices described herein may further implement Multiple Input Multiple Output (MIMO) technology and be implemented as part of the 802.11ah standard. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels or streams, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In some implementations, a WLAN includes various devices which are the components that access the wireless network. For example, there may be two types of devices: access points ("APs") and clients (also referred to as stations, or "STAB"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106a, 106b, 106c, 106d (collectively STAs 106).

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
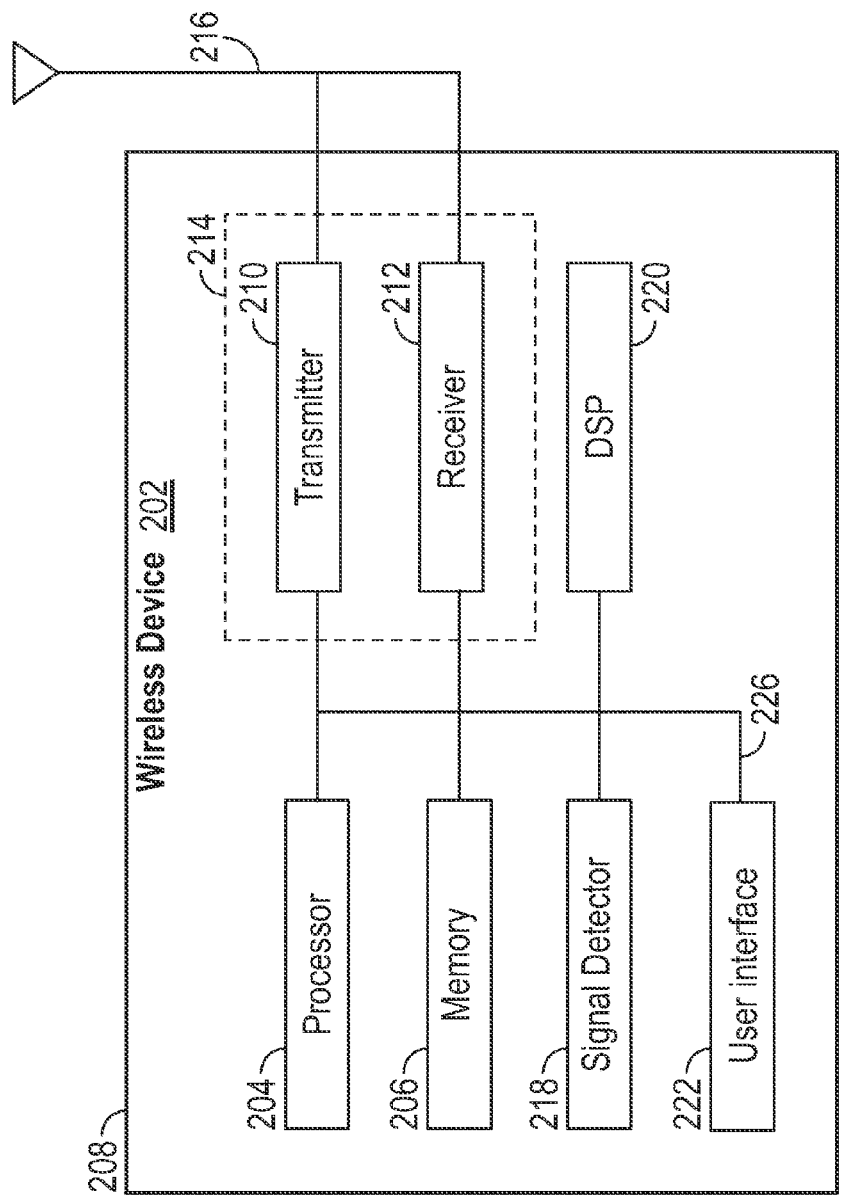
FIG. 2 illustrates various components that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106 of FIG. 1.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

When the wireless device 202 is implemented or used as a transmitting node, the processor 204 may be configured to select one of a plurality of packet formats, and to generate a packet having that format. For example, the processor 204 may be configured to generate a packet comprising a preamble, such as a physical layer preamble and a payload and to determine whether to include an extension field in the preamble, as discussed in further detail below. The processor 204 may further be configured to generate a packet having a training field with a repeated sequence.

When the wireless device 202 is implemented or used as a receiving node, the processor 204 may be configured to process packets having a plurality of formats. For example, the processor 204 may be configured to process a payload of a packet based on a preamble of the packet. In some aspects, the preamble includes an extension field, as discussed in further detail below.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets having a plurality of different formats. For example, the transmitter 210 may be configured to transmit different types of packets generated by the processor 204, discussed above.

The receiver 212 may be configured to wirelessly receive packets having a plurality of different formats. In some aspects, the receiver 212 is configured to detect a type of a received packet, as discussed in further detail below. For example, the receiver may implement an auto-detect procedure to determine a format of a received packet prior to the processing system processing the packet or a payload thereof.

The wireless device 202 may also include a signal detector 218 that may be used to detect and quantify the level of signals received by the transceiver 214. The signal detector 218 may detect such signals as total energy, energy per subcarrier per symbol, power spectral density, and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. The components of the wireless device 202 may further be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements. Furthermore, the processor 204 may be used to implement any of the components, modules, circuits, or the like described, or each may be implemented using a plurality of separate elements.

For ease of reference in this disclosure, when the wireless device 202 is configured as a transmitting node, it may hereinafter be referred to as a wireless device 202t. Similarly, when the wireless device 202 is configured as a receiving node, it may hereinafter be referred to as a wireless device 202r. A device in the wireless communication system 100 of FIG. 1 may implement only functionality of a transmitting node, only functionality of a receiving node, or functionality of both a transmitting node and a receive node.

Figure 3:
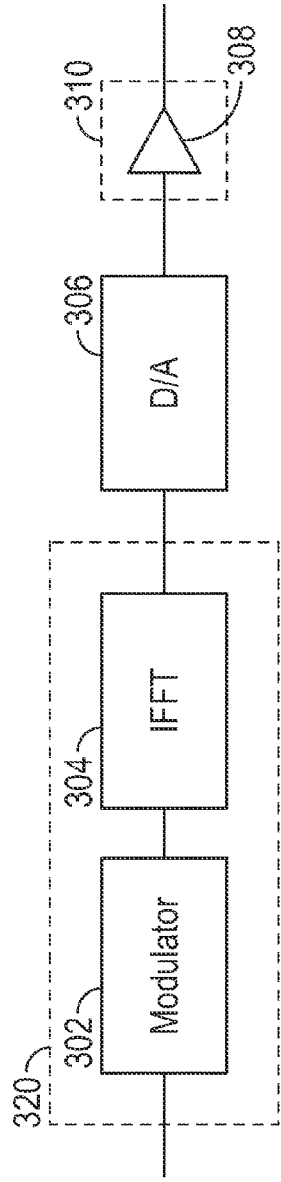
FIG. 3 illustrates various components that may be utilized in the wireless device of FIG. 2 to transmit wireless communications.

The wireless device 202t of FIG. 3 may comprise a modulator 302 configured to modulate bits for transmission. For example, the modulator 302 may determine a plurality of symbols from bits received from the processor 204 (FIG. 2) or the user interface 222 (FIG. 2), for example by mapping bits to a plurality of symbols according to a constellation. The bits may correspond to user data or to control information. In some aspects, the bits are received in codewords. In one aspect, the modulator 302 comprises a QAM (quadrature amplitude modulation) modulator, for example a 16-QAM modulator or a 64-QAM modulator. In other aspects, the modulator 302 comprises a binary phase-shift keying (BPSK) modulator or a quadrature phase-shift keying (QPSK) modulator.

The wireless device 202t may further comprise a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes. In some implementations, the transform module 304 may be itself configured to transform units of data of different sizes. For example, the transform module 304 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the transform module 304 may be referred to as the size of the transform module 304.

In FIG. 3, the modulator 302 and the transform module 304 are illustrated as being implemented in the DSP 320. In some aspects, however, one or both of the modulator 302 and the transform module 304 are implemented in the processor 204 or in another element of the wireless device 202 (e.g., see description above with reference to FIG. 2).

As discussed above, the DSP 320 may be configured to generate a data unit for transmission. In some aspects, the modulator 302 and the transform module 304 may be configured to generate a data unit comprising a plurality of fields including control information and a plurality of data symbols. The fields including the control information may comprise one or more training fields, for example, and one or more signal (SIG) fields. Each of the training fields may include a known sequence of bits or symbols. Each of the SIG fields may include information about the data unit, for example a description of a length or data rate of the data unit.

In some aspects, the DSP 320 is configured to insert one or more training fields between a plurality of data symbols. The DSP 320 may determine a position or location of the one or more training fields in the data unit based on information received from the processor 204 (FIG. 2), and/or stored in the memory 206 (FIG. 2) or in a portion of the DSP 320. Inserting the training fields in the data unit will be discussed in additional detail.

Returning to the description of FIG. 3, the wireless device 202t may further comprise a digital to analog converter 306 configured to convert the output of the transform module into an analog signal. For example, the time-domain output of the transform module 306 may be converted to a baseband OFDM signal by the digital to analog converter 306. The digital to analog converter 306 may be implemented in the processor 204 or in another element of the wireless device 202 of FIG. 2. In some aspects, the digital to analog converter 306 is implemented in the transceiver 214 (FIG. 2) or in a data transmit processor.

The analog signal may be wirelessly transmitted by the transmitter 310. The analog signal may be further processed before being transmitted by the transmitter 310, for example by being filtered or by being upconverted to an intermediate or carrier frequency. In the aspect illustrated in FIG. 3, the transmitter 310 includes a transmit amplifier 308. Prior to being transmit, the analog signal may be amplified by the transmit amplifier 308. In some aspects, the amplifier 308 comprises a low noise amplifier (LNA).

The transmitter 310 is configured to transmit one or more packets or data units in a wireless signal based on the analog signal. The data units may be generated using the processor 204 (FIG. 2) and/or the DSP 320, for example using the modulator 302 and the transform module 304 as discussed above. Data units that may be generated and transmitted as discussed above are described in additional detail in this disclosure.

In some aspects, the transmitter 310 is configured to transmit the data units over a bandwidth of approximately 2.5 MHz or 1.25 MHz, or lower. When using such bandwidths, transmission of the data unit may be performed over a relatively lengthy period of time. For example, a data unit composed of 500 bytes may be transmitted over a period of approximately 11 milliseconds. Such transmission is approximately sixteen times slower than comparable transmissions implemented pursuant to the 802.11ac standard over bandwidths of approximately 20 MHz.

Figure 4:
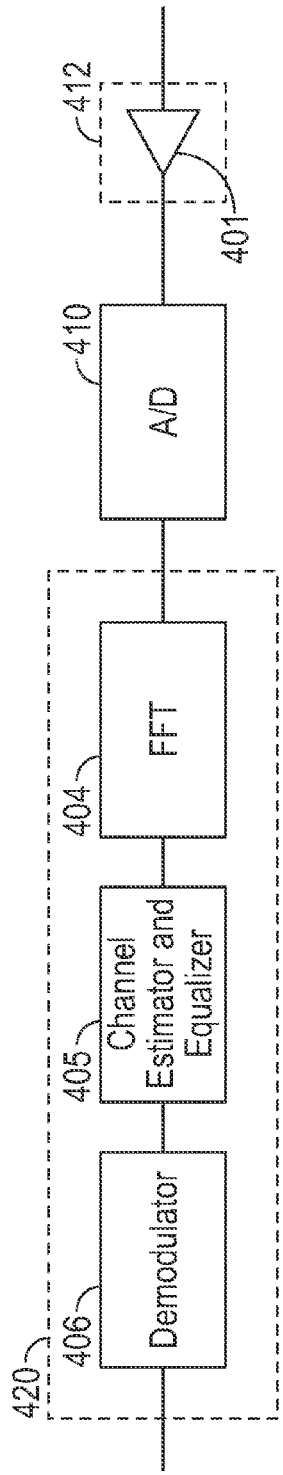
FIG. 4 illustrates various components that may be utilized in the wireless device of FIG. 2 to receive wireless communications.

FIG. 4 illustrates various components that may be utilized in the wireless device 202 of FIG. 2 to receive wireless communications. The components illustrated in FIG. 4 may be used, for example, to receive OFDM communications. For example, the components illustrated in FIG. 4 may be used to receive data units transmitted by the components discussed above with respect to FIG. 3.

The receiver 412 of wireless device 202r is configured to receive one or more packets or data units in a wireless signal. Data units that may be received and decoded or otherwise processed as discussed below are described in additional detail in this disclosure.

In some aspects, the receiver 412 is configured to receive the data units over a bandwidth of approximately 2.5 MHz or 1.25 MHz, or lower. When using such bandwidths, reception of the data unit may be performed over a relatively lengthy period of time, for example approximately 11 milliseconds when the data unit is composed of 500 bytes. During this time, the channel over which the data unit is received may be changing. For example, conditions of the channel may change due to movement of the wireless device 202r or of a device transmitting the data unit, or due to weather or other environmental conditions such as the introduction of various obstacles. In such circumstances, information near the end of the data unit may not be correctly decoded if the wireless device 202r uses settings determined when reception of the data unit began. As described in additional detail below, however, the wireless device 202r may use the training fields interposed between the plurality of data symbols to form an updated estimate of the channel in order to properly decode one or more of the data symbols.

In the aspect illustrated in FIG. 4, the receiver 412 includes a receive amplifier 401. The receive amplifier 401 may be configured to amplify the wireless signal received by the receiver 412. In some aspects, the receiver 412 is configured to adjust the gain of the receive amplifier 401 using an automatic gain control (AGC) procedure. In some aspects, the automatic gain control uses information in one or more received training fields, such as a received short training field (STF), for example, to adjust the gain. Those having ordinary skill in the art will understand methods for performing AGC. In some aspects, the amplifier 401 comprises an LNA.

The wireless device 202r may comprise an analog to digital converter 410 configured to convert the amplified wireless signal from the receiver 410 into a digital representation thereof. Further to being amplified, the wireless signal may be processed before being converted by the digital to analog converter 410, for example by being filtered or downconverted to an intermediate or baseband frequency. The analog to digital converter 410 may be implemented in the processor 204 or in another element of the wireless device 202 (FIG. 2). In some aspects, the analog to digital converter 410 is implemented in a transceiver or in a data receive processor.

The wireless device 202r may further comprise a transform module 404 configured to convert the representation of the wireless signal into a frequency spectrum. In FIG. 4, the transform module 404 is illustrated as being implemented by a fast Fourier transform (FFT) module. In some aspects, the transform module may identify a symbol for each point that it uses. As described above with reference to transform module 304 of FIG. 3, the transform module 404 may be configured with a plurality of modes, and may use a different number of points to convert the signal in each mode. For example, the transform module 404 may have a mode where 32 points are used to convert a signal received over 32 tones into a frequency spectrum, and a mode where 64 points are used to convert a signal received over 64 tones into a frequency spectrum. The number of points used by the transform module 404 may be referred to as the size of the transform module 404. In some aspects, the transform module 404 may identify a symbol for each point that it uses.

The wireless device 202r may further comprise a channel estimator and equalizer 405 configured to form an estimate of the channel over which the data unit is received, and to remove certain effects of the channel based on the channel estimate. For example, the channel estimator may be configured to approximate a function of the channel, and the channel equalizer may be configured to apply an inverse of that function to the data in the frequency spectrum.

In some aspects, the channel estimator and equalizer 405 uses information in one or more received training fields, such as a long training field (LTF) for example, to estimate the channel. The channel estimate may be formed based on one or more LTFs received at the beginning of the data unit. This channel estimate may thereafter be used to equalize data symbols that follow the one or more LTFs. After a certain period of time or after a certain number of data symbols, one or more additional LTFs may be received in the data unit. The channel estimate may be updated or a new estimate formed using the additional LTFs. This new or updated channel estimate may be used to equalize data symbols that follow the additional LTFs. In some aspects, the new or updated channel estimate is used to re-equalize data symbols preceding the additional LTFs. Those having ordinary skill in the art will understand methods for forming a channel estimate.

The wireless device 202r may further comprise a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. The bits may be processed or evaluated by the processor 204 (FIG. 2), or used to display or otherwise output information to the user interface 222 (FIG. 2). In this way, data and/or information may be decoded. In some aspects, the bits correspond to codewords. In one aspect, the demodulator 406 comprises a QAM (quadrature amplitude modulation) demodulator, for example a 16-QAM demodulator or a 64-QAM demodulator. In other aspects, the demodulator 406 comprises a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in the DSP 420. In some aspects, however, one or more of the transform module 404, the channel estimator and equalizer 405, and the demodulator 406 are implemented in the processor 204 or in another element of the wireless device 202 (e.g., see description above with reference to FIG. 2).

As discussed above, the wireless signal received at the receiver 412 comprises one or more data units. Using the functions or components described above, the data units or data symbols therein may be decoded evaluated or otherwise evaluated or processed. For example, the processor 204 (FIG. 2) and/or the DSP 420 may be used to decode data symbols in the data units using the transform module 404, the channel estimator and equalizer 405, and the demodulator 406.

Data units exchanged by the AP 104 and the STA 106 may include control information or data, as discussed above. At the physical (PHY) layer, these data units may be referred to as physical layer protocol data units (PPDUs). In some aspects, a PPDU may be referred to as a packet or physical layer packet. Each PPDU may comprise a preamble and a payload. The preamble may include training fields and a SIG field. The payload may comprise a Media Access Control (MAC) header or data for other layers, and/or user data, for example. The payload may be transmitted using one or more data symbols. The systems, methods, and devices herein may utilize data units with training fields that are also interposed between data symbols in the payload.

The wireless device 202*t* shown in FIG. 3 shows an example of a single transmit chain to be transmitted over an antenna. The wireless device 202*r* shown in FIG. 4 shows an example of a single receive chain to be received over an antenna. In some implementations, the wireless devices 202*t* and 202*r* may implement a portion of a MIMO system using multiple antennas to simultaneously transmit data.

Figure 5:
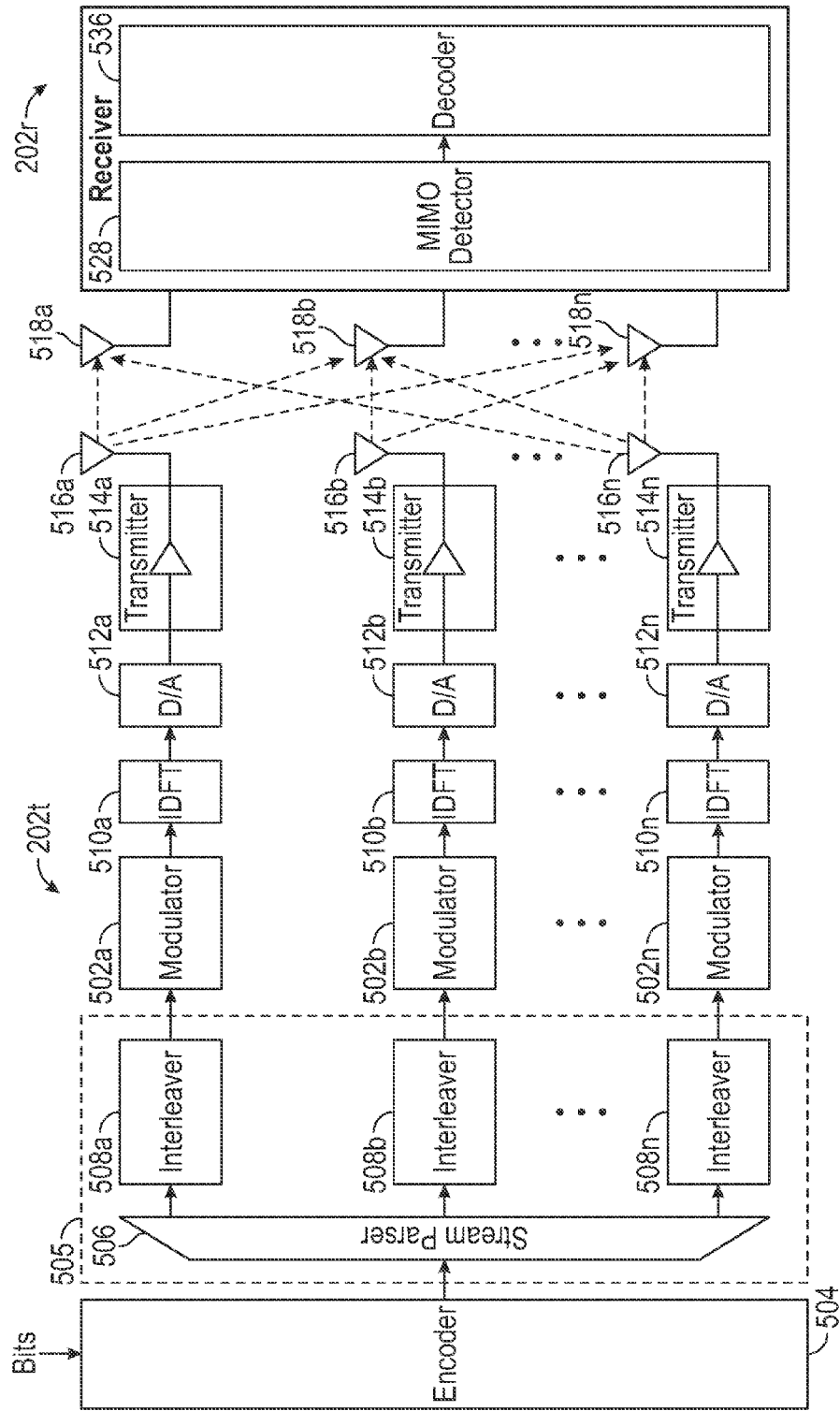
FIG. 5 is a functional block diagram of an example MIMO system that may be implemented in wireless devices such as the wireless device of FIG. 2 to transmit wireless communications.

FIG. 5 is a functional block diagram of a MIMO system that may be implemented in wireless devices such as the wireless device 202 of FIG. 2 to transmit and receive wireless communications. The MIMO system may make use of some or all of the components described with reference to FIG. 3. Bits for transmission that are to be received at an output of the receiver are provided to an encoder 504. The encoder 504 may apply a forward error correcting (FEC) code on the bit stream. The FEC code may be a block code, a convolutional code, or the like. The encoded bits are provided to an interleaving system 505 that distributes the encoded bits into N transmit streams.

The interleaving system 505 includes a stream parser 506 that parses an input bit stream from the encoder 504 to N spatial stream interleavers 508*a*, 508*b*, and 508*n* (collectively interleaver 508). The stream parser 506 may be provided with the number of spatial streams and parse bits on a round-robin basis. Other parsing functions may also be used. One parsing function that may be used is $k_n = N_{TX} * k + n$ (i.e., round-robin with one bit per spatial stream, then on to the next spatial stream where $k_n$ is the input bit index and $N_{TX}$ is the number of transmitters/spatial streams). Another more general function f(k,n) may also be used, for example, sending two bits to a spatial stream, then moving on to the next spatial stream. Each interleaver 508*a*, 508*b*, and 508*n* may each thereafter distribute bits so that errors may be recovered due to fading or other channel conditions.

Each transmit stream may then be modulated by a modulator 502*a*, 502*b*, or 502*n*. As described above with reference to FIG. 3, the bits may be modulated using modulation techniques such as QPSK (Quaternary Phase Shift Keying) modulation, BPSK (mapping one bit at a time), 16-QAM (mapping group of six bits), 64-QAM, and the like. The modulated bits for each stream may be provided to transform modules 510*a*, 510*b*, and 510*n*. In some implementations, the transform modules 510*a*, 510*b*, and 510*n* may perform an inverse discrete time fourier transform (IDFT) to convert the modulated bits from a frequency domain into a time domain. The transform modules 510*a*, 510*b*, and 510*n* may operate according to different modes as described above with reference to FIG. 3. For example, the transform modules 510*a*, 510*b*, and 510*n* may be configured to operate according to a 32 point mode or a 64 point mode. In some implementations, the modulated bits may be encoded using space time block coding (STBC) and spatial mapping may be performed before being provided to transform modules 510*a*, 510*b*, and 510*n*. After the modulated bits have been converted into time domain signals for each spatial stream, the time domain signal may be converted into an analog signal via converters 512*a*, 512*b*, and 512*n* as described above with reference to FIG. 3. The signals may then be transmitted using transmitters 514*a*, 514*b*, and 514*c* and using antennas 516*a*, 516*b*, or 516*n*, into a wireless radio space over a desired frequency bandwidth (e.g., 1 MHz, 2 MHz, 4 MHz, 8 MHz, and 16 MHz, or higher).

In some embodiments, antennas 516*a*, 516*b*, and 516*n* are distinct and spatially separated antennas. In other embodiments, distinct signals may be combined into different polarizations off of fewer than N antennas. An example of this is where spatial rotation or spatial spreading is done and multiple spatial streams are mapped on a single antenna. Further, distinct spatial streams can be organized in different manners. For example, a transmit antenna may carry data from more than one spatial stream or several transmit antennas may carry data from a spatial stream. For example, consider the case of a transmitter with four transmit antennas and two spatial streams. Each spatial stream can be mapped onto two transmit antennas, so two antennas are carrying data from just one spatial stream.

Figure 6:
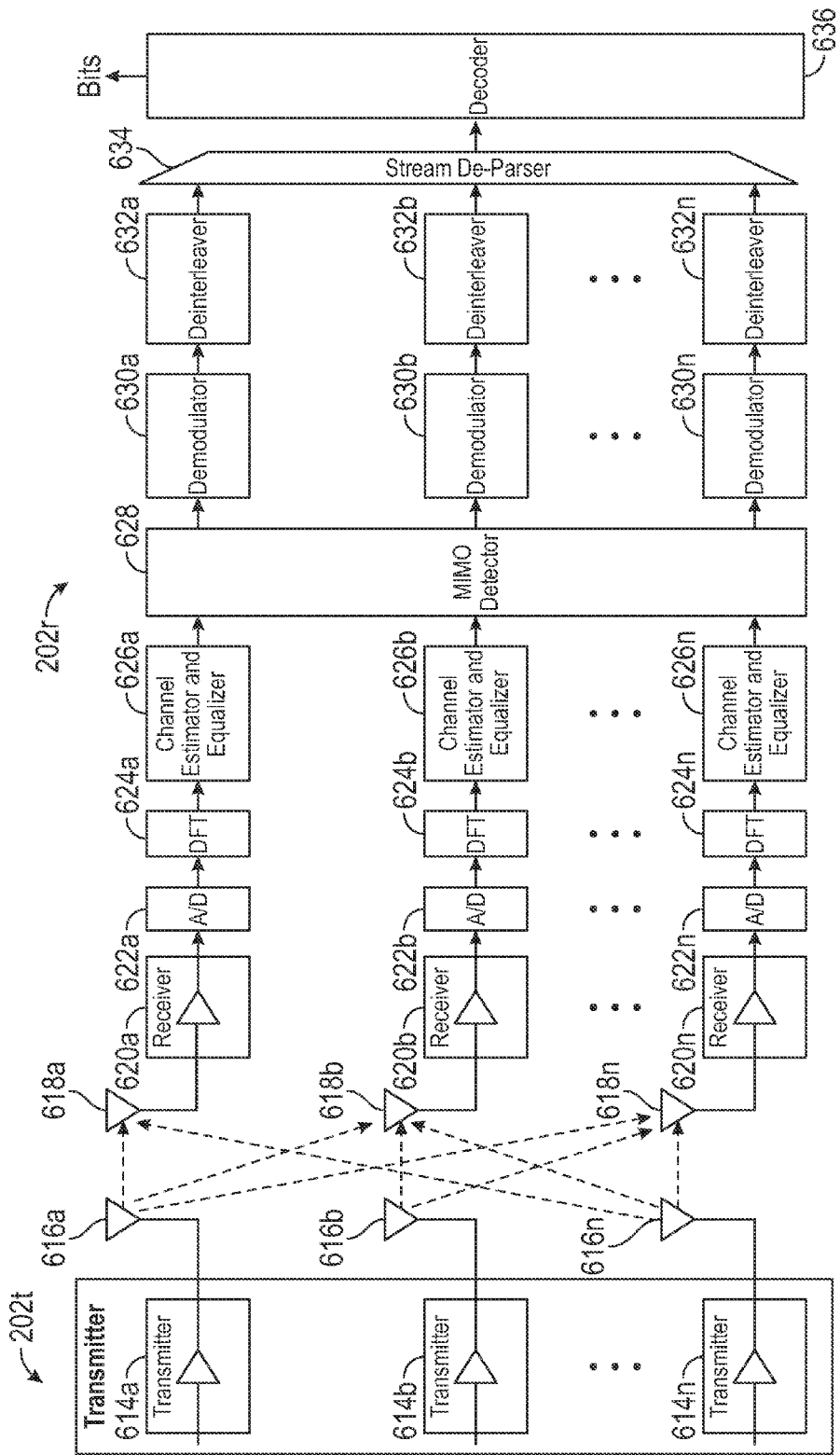
FIG. 6 is a functional block diagram of an example MIMO system that may be implemented in wireless devices such as the wireless device of FIG. 2 to receive wireless communications.

FIG. 6 is a functional block diagram of an exemplary MIMO system that may be implemented in wireless devices such as the wireless device 202 of FIG. 2 to receive wireless communications. The MIMO system may make use of some or all of the components described with reference to FIG. 4. The wireless device 202*r* may be configured to receive transmissions from the antennas 516*a*, 516*b*, and 516*n* of FIG. 5. A wireless device 202*r* receives signals from the channel at N antennas 518*a*, 518*b*, and 518*n* or 618*a*, 618*b*, and 618*n* (counting separate polarizations, as appropriate) coupled to N receive circuits. The signals are then provided to receivers 620*a*, 620*b*, and 620*n* that each may include an amplifier configured to amplify the received signals. The signals may then be converted into a digital form via converters 622*a*, 622*b*, and 622*n*.

Converted signals may then be converted into a frequency spectrum via transform modules 624*a*, 624*b*, and 624*n*. As described above, the transform modules 624*a*, 624*b*, and 624*n* may operate according to various modes and according to the size and bandwidth used (e.g., 32 point 64 point, etc.). The transformed signals may be provided to respective channel estimator and equalizer blocks 626*a*, 626*b*, and 626*n* that may function similarly as described above with reference to FIG. 4. After channel estimation, the outputs may be provided to a MIMO detector 628 (e.g., corresponding to MIMO detector 528 of FIG. 5) which may thereafter provide its output to demodulators 630*a*, 630*b*, and 630*n* which may demodulate the bits according to one of the modulation techniques as described above. Demodulated bits may then be provided to deinterleavers 632*a*, 632*b*, and 632*n* which may pass bits into a stream de-parser 634 which may provide the bits into a single bit stream into a decoder 636 (e.g., corresponding to decoder 536 of FIG. 5) that may decode the bits into an appropriate data stream.

As described above, data units exchanged by the AP 104 and the STA 106 may include control information or data in the form of physical (PHY) layer packets or physical layer protocol data units (PPDUs).

Figure 7:
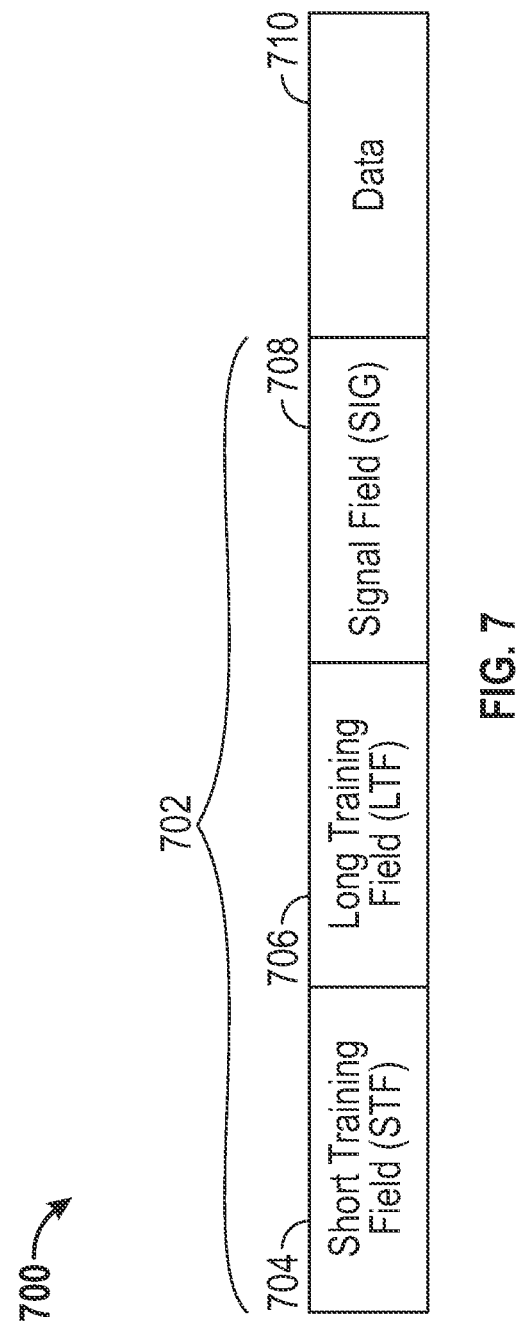
FIG. 7 is a block diagram showing an example structure of a preamble and payload of a physical layer packet.

FIG. 7 is a block diagram showing an example structure of a preamble 702 and payload 710 of a physical layer packet 700. The preamble 702 may include a short training field (STF) 704 that includes an STF sequence of known values. In some aspects, the STF may be used for packet detection (e.g., to detect the start of a packet) and for coarse time/frequency estimation. The STF sequence may be optimized to have a low PAPR and include a subset of non-zero tones with a particular periodicity. The STF 704 may span one or multiple OFDM symbols. In some aspects, the preamble 702 may include a long training field (LTF) 706 that may span one or multiple OFDM symbols and may include one or more LTF sequences of known non-zero values. The LTF may be used for channel estimation, fine time/frequency estimation, and mode detection. Further, in some aspects, the preamble 702 may include a signal field (SIG) 708 as described above that may include a number of bits or values used in one aspect for mode detection purposes and determination of transmission parameters.

Certain implementations described herein may be directed to wireless communication systems that may be used for smart metering or in a smart grid network. These wireless communication systems may be used to provide sensor applications or in home automation. Wireless devices used in such systems may instead or in addition be used in a healthcare context, for example, for personal healthcare. They may also be used for surveillance, to enable extended-range Internet connectivity (e.g., for use with hotspots), or to implement machine-to-machine communications. Accordingly, some implementations may use low data rates such as approximately 150 Kbps. Implementations may further have increased link budget gains (e.g., around 20 dB) over other wireless communications such as 802.11b. In accordance with low data rates, if wireless nodes are configured for use in a home environment, certain aspects may be directed to implementations with good in-home coverage without power amplification. Furthermore, certain aspects may be directed to single-hop networking without using a MESH protocol. In addition, certain implementations may result in significant outdoor coverage improvement with power amplification over other wireless protocols. Furthermore, certain aspects may be directed to implementations that may accommodate large outdoor delay-spread and reduced sensitivity to Doppler. Certain implementations may achieve similar LO accuracy as traditional WiFi.

Accordingly, certain implementations are directed to transmitting and receiving wireless signals in sub-gigahertz bands. In one aspect, this may result in a propagation gain of, for example, 8.5 dB (e.g., available due to 900 MHz vs. 2.4 GHz). In another aspect, obstruction loss may be reduced by using sub-gigahertz signal which may result in, for example, a 3 dB gain.

Certain implementations are further directed to sending wireless signals with low bandwidths in sub-gigahertz bands. This may further allow achieving greater link budget gains over other wireless communication systems. For example, in one implementation, a symbol may be configured to be transmitted or received using a bandwidth of 1 MHz. The wireless device 202 of FIG. 2 may be configured to operate in one of several modes. In one mode, symbols such as OFDM symbols may be transmitted or received using a bandwidth of 1 MHz. In another mode, symbols may be transmitted or received using a bandwidth of 2 MHz. Additional modes may also be provided for transmitting or receiving symbols using a bandwidth of 4 MHz, 8 MHz, 16 MHz, and the like. The bandwidth may also be referred to as the channel width.

Each mode may use a different number of tones/subcarriers for transmitting the information. For example, in one implementation, a 1 MHz mode (corresponding to transmitting or receiving symbols using a bandwidth of 1 MHz) may use 32 tones. In one aspect, using a 1 MHz mode may provide for a 13 dB noise reduction as compared to a bandwidth such as 20 MHz. In addition, low rate techniques may be used to overcome effects such as frequency diversity losses due to a lower bandwidth which could result in 4-5 dB losses depending on channel conditions. To generate/evaluate symbols sent or received using 32 tones, a transform module 304 or 404 as described in FIGS. 3 and 4 may be configured to use a 32 point mode (e.g., a 32 point IFFT or FFT). The 32 tones may be allocated as data tones, pilot tones, guard tones, and a DC tone. In one implementation, 24 tones may be allocated as data tones, 2 tones may be allocated as pilot tones, five tones may be allocated as guard tones, and 1 tone may be reserved for the DC tone. In this implementation, the symbol duration may be configured to be 40 µs including cyclic prefix.

For example, a wireless device 202*t* of FIG. 3 may be configured to generate a packet for transmission via a wireless signal using a bandwidth of 1 MHz. In one aspect, the bandwidth may be approximately 1 MHz where approximately 1 MHz may be within a range of 0.8 MHz to 1.2 MHz. The packet may be formed of one or more OFDM symbols having 32 tones allocated as described using a DSP 320 (FIG. 3). A transform module 304 (FIG. 3) in a transmit chain may be configured as an IFFT module operating according to a thirty-two point mode to convert the packet into a time domain signal. A transmitter 310 (FIG. 3) may then be configured to transmit the packet.

Likewise, a wireless device 202*r* of FIG. 4 may be configured to receive the packet over a bandwidth of 1 MHz. In one aspect, the bandwidth may be approximately 1 MHz where approximately 1 MHz may be within a range of 0.8 MHz to 1.2 MHz. The wireless device 202*r* may include a DSP 420 (FIG. 4) including a transform module 404 (FIG. 4) in a receive chain that may be configured as an FFT module operating according to a thirty-two point mode to transform the time domain signal into a frequency spectrum. A DSP 420 may be configured to evaluate the packet. The 1 MHz mode may support a modulation and coding scheme (MCS) for both a low data rate and a "normal" rate. According to some implementations, the preamble 702 may be designed for a low rate mode that offers reliable detection and improved channel estimation as will be further described below. Each mode may be configured to use a corresponding preamble configured to optimize transmissions for the mode and desired characteristics.

In addition to a 1 MHz mode, a 2 MHz mode may additionally be available that may be used to transmit and receive symbols using 64 tones. In one implementation, the 64 tones may be allocated as 52 data tones, 4 pilot tones, 1 DC tone, and 7 guard tones. As such, a transform module 304 or 404 of FIGS. 3 and 4 may be configured to operate according to a 64 point mode when transmitting or receiving 2 MHz symbols. The symbol duration may also be 40 µs including cyclic prefix. Additional modes with different bandwidths (e.g., 4 MHz, 8 MHz, and 16 MHz) may be provided that may use transform modules 304 or 404 operating in modes of corresponding different sizes (e.g., 128 point FFT, 256 point FFT, 512 point FFT, etc.). In addition, each of the modes described above may be configured additionally according to both a single user mode and a multi user mode. Wireless signals using bandwidths less than or equal to 2 MHz may provide various advantages for providing wireless nodes that are configured to meet global regulatory constraints over a broad range of bandwidth, power, and channel limitations.

In some aspects, the wireless device 202 of FIG. 2 is configured to operate according to several wireless standards, for example, according to one of the 802.11 standards. In this configuration, the wireless device 202 may have a mode for operating in a 20 MHz channel width in the 2.4 GHz or 5 GHz band, as well as a mode for operating in a 40 MHz channel width in the 2.4 GHz band. In another aspect, the wireless device 202 is configured to operate pursuant to the 802.11ac standard. In this configuration, the wireless device 202 has a mode for operating in each of a 20 MHz, 40 MHz, and 80 MHz channel width. Generally, the transform module 304 or 404 may use 64 tones when the wireless device 202 is operating in the 20 MHz band, may use 128 tones when the wireless device 202 is operating in the 40 MHz band, and may use 256 tones when the wireless device 202 is operating in the 80 MHz band.

In some aspects, a controller (e.g., such as processor 204 or DSP 220 of FIG. 2) is configured to adjust operation of the wireless device 202 of FIG. 2 so as to operate in a sub-gigahertz band as described above. In one implementation, to operate according to a mode such as 1 MHz, 2 MHz, 4 MHz, etc. as described above, a controller may be configured to downclock one or more of the components in the wireless device 202 such that the wireless device 202 will operate in a 1 MHz, 2 MHz, 4 MHz, 8 MHz, or 16 MHz. In addition, the processor 204 may be configured to downclock operation of one or more of the components in the wireless device 202 such that the wireless device 202 will operate in modes corresponding to using bandwidths of 5 MHz, 2.5 MHz, 1.25 MHz, and/or 0.625 MHz channel width. During such downclocked operation, the number of tones used by the transform module 304 or 404 may remain the same in some aspects.

Downclocking operation of the wireless device 202 may comprise operating one or more of the components illustrated in FIG. 2 at a reduced clock rate. For example, the downclocking may comprise operating the processor 204, the signal detector 218, the DSP 220, and/or any other digital signal circuitry at a lower rate, for example by adjusting, modifying, or assigning the timing settings of one or more of these components. In some aspects, the downclocked operation is performed in response to a command from the processor 204. In some aspects, the processor 204 provides a clock signal which is reduced in comparison to a clock signal used when operating in the 20 MHz, 40 MHz, or 80 MHz channel width.

In some aspects, the processor 204 is configured to cause the operation of the wireless device 202 of FIG. 2 to be downclocked by a factor of 10 (e.g., by 10x). In such configuration, operation in the 20 MHz channel width will be downclocked to operation in a 2 MHz channel width, and operation in the 40 MHz channel width will be downclocked to operation in a 4 MHz channel width. Furthermore, operation in the 80 MHz channel width will be downclocked to operation in an 8 MHz channel width, and operation in the 160 MHz channel width will be downclocked to operation in a 16 MHz channel width.

Similarly as described above, in one aspect, when a 1 MHz bandwidth for transmission or reception of OFDM symbols is used, a 32 point transform module 304 or 404 may be used. In this case, tones may be allocated as 24 data tones, 2 pilot tones, 5 guard tones, and a DC tone. In another aspect, when a 2 MHz bandwidth for transmission or reception of OFDM symbols is used, a 64 point transform module 304 or 404 may be used. In this case, tones may be allocated as 52 data tones, 4 pilot tones, 7 guard tones, and a DC tone. In yet another aspect, when a 4 MHz bandwidth for transmission or reception of OFDM symbols is used, a 64 point transform module 304 or 404 of FIGS. 3 and 4 may be used. In this case tones may be allocated as 108 data tones, 6 pilot tones, 11 guard tones, and three DC tones. In yet a further aspect, when a 8 MHz bandwidth for transmission or reception of OFDM symbols is used, a 256 point transform module 304 or 404 may be used. In this case tones may be allocated as 234 data tones, 8 pilot tones, 11 guard tones, and three DC tones. Accordingly, the spacing between tones for these bandwidths may be 31.25 KHz. In addition, the symbol duration may be 40 us including a cyclic prefix of either 4 μs (for short cyclic prefixes) or 8 μs (for long cyclic prefixes). A longer cyclic prefix may be used to accommodate outdoor delay spreads. Furthermore, large symbol durations may be needed to keep cyclic prefix overhead manageable.

In some aspects, the amount by which operation of the wireless device 202 of FIG. 2 is downclocked is predetermined. For example, the downclocking factor may be stored in the memory 206, and loaded at startup of the wireless device 202. In such configuration, the processor 204 may cause the wireless device 202 to operate in a downclocked mode according to the predetermined or loaded downclocking factor.

In some aspects, the amount by which operation of the wireless device 202 of FIG. 2 is downclocked at any given time may be determined in situ. For example, the signal detector 218 may determine a downclocking factor from a beacon or pilot received by the receiver 212. In some aspects, this factor is determined at startup of the device, or when connecting to the network for the first time. In some aspects, a new factor is determined during handoff of the wireless device 202 or each time the wireless device 202 connects to a new network. In some aspects, a predetermined factor may be modified or updated based on a received signal, such as based on a received beacon or pilot. In this way, the wireless device 202 may operate in different bandwidths pursuant to a location of the device or a network to which the device is connecting, for example. The processor 204 may cause the wireless device 202 to operate in a downclocked mode according to the determined downclocking factor.

In some aspects, the wireless device 202 of FIG. 2 is permanently configured to operate in the downclocked mode. For example, the components of the wireless device 202 may be hardwired or have firmware installed therein that causes the device to always perform downclocked operation. In such aspects, the wireless device 202 may be incapable of communicating in the 20 MHz, 40 MHz, and 80 MHz channel widths. Further, the factor of downclocking may be fixed in such aspects. For example, the components may be manufactured and/or installed so as to implement only the fixed downclocking factor. In other aspects, the wireless device may be operated in any of the 20 MHz, 40 MHz, and 80 MHz channel widths, or may be selectively downclocked by the processor 204 to operate in the 1 MHz, 2 MHz, 4 MHz, 8 MHz, and 16 MHz channel width.

In some implementations, when transmitting in a sub-gigahertz range (e.g., 900 MHz), a repetition mode may be used where repetition coding is implemented. A repetition mode may allow for accurate transmission over long distances without sacrificing too much preamble overhead. In some implementations 2× repetition encoding may be used. For example, repetition encoding may allow for as little as 105 dB of pathloss to provide good in-home coverage. When using a wireless sensor network, without repetition coding, customers may have to install higher-power sensors in difficult to reach places. It may not be practical to sell two types of sensors (sensors for "easy to reach places" versus "difficult to reach places"). Furthermore, high-power sensors may not be able to work with low power batteries (e.g., coin-cell batteries) due to peak current drain. Alternatively, without repetition, multiple APs could be installed. However, choosing location and configuration of the APs could be non-trivial for an average consumer. As such, repetition coding may provide various advantages for certain implementations for low data rate applications such as sensor networks.

As an example, in one aspect BPSK rate ½ coding may be used with 4× repetition yielding 94 Kbps. In another aspect, BPSK rate ½ coding may be used with 2× repetition yielding 188 Kbps. In yet another aspect, BPSK rate ½ coding may be used yielding 375 Kbps. In a further aspect, 64 QAM rate ¾ coding may be used resulting in 3.75 Mbps.

In some implementations, the 1 MHz mode and the 2 MHz mode may be required and configured to be interoperable. Using two required modes may avoid issues where devices could be configured for some regulatory regions but may not work for other regulatory regions and may allow for devices to have more options if regulatory constraints change allowing for less restrictive communications. Higher bandwidths (e.g., 8 MHz) may be used for cellular offload.

With reference to FIG. 7, when transmitting packets in sub-gigahertz bands with bandwidths as described above, the preamble 702 may be designed to have robust mode detection in an early state of the preamble to detect between different modes. The preamble 702 may further be optimized to minimize overhead and provide adequate coexistence of devices transmitting using the 1 MHz mode and devices transmitting using greater than or equal to 2 MHz modes. The preamble 702 may be designed to have robust mode detection in an early state of the preamble to detect between 1 MHz transmissions (32 pt FFT) and 2 MHz transmissions (64 pt FFT). The physical layer packet 700 may be generated for transmission for different data rates to allow in one aspect for transmission of data over greater distances. For example, the physical layer packet 700 may be generated for a low data rate along with another "normal" data rate as described above.

Figure 8A:
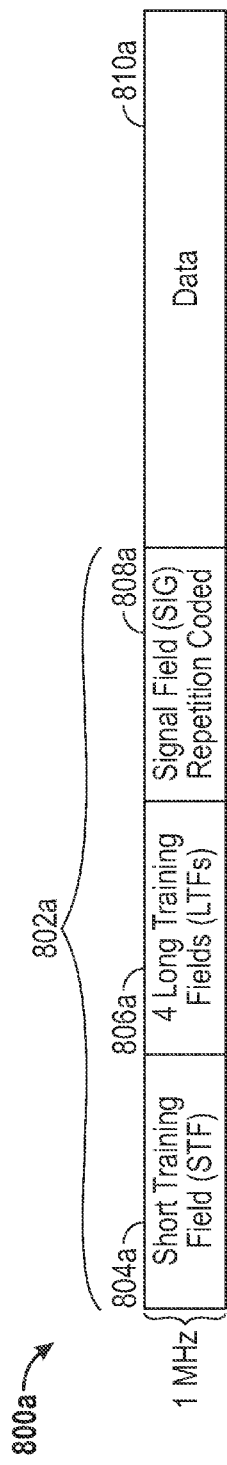
FIG. 8A is a block diagram showing an example structure of a preamble and payload of a physical layer packet for transmission over a bandwidth of substantially 1 MHz.

FIG. 8A is a block diagram showing an example structure of a preamble 802a and payload 810a of a physical layer packet 800a for transmission over a bandwidth of substantially 1 MHz according to certain implementations. The physical layer packet 800a may be generated using a transform module 304 (FIG. 3) that is configured according to a 32 point FFT mode for transmitting an OFDM symbol with 32 tones as described above.

The preamble 802a may include a short training field (STF) 804a. The STF 804a may include a sequence of known values with a subset of non-zero values corresponding to a subset of non-zero tones with a particularly chosen periodicity. The periodicity of the non-zero tones may be the same as used for STF sequences used in higher bandwidths such as 2 MHz. In some implementations, the STF field 804a may be boosted, such as by 3 dB for repetition coding. The STF 804a may be sent over four OFDM symbols where each symbol repeats a known STF sequence.

The preamble 802a may include a long training field (LTF) 806a. The LTF 806a may be formed of four OFDM symbols and may include an LTF sequence transmitted in each symbol. The LTF sequences may be formed of known non-zero values corresponding to non-zero tones for all pilot and data tones. In some implementations, the LTF sequences may therefore include 26 non-zero values.

The preamble 802a may include a signaling field (SIG) 808a. In some implementations, the SIG field 808a may be repetition coded or 2× repetition coded. The physical layer packet 800a may further include the payload 810a that may be generated using 24 tones in each OFDM symbol allocated for data. The preamble 802a may be used for generating either a low rate or a normal rate 1 MHz transmission. The preamble 802a may be used according to a single user mode.

As described above, the SIG field 808a for a 1 MHz mode may be two symbols. In one implementation, the entries into the SIG field 808a may correspond to the entries shown in Table 1 below. As such, the SIG field 808a may include 36 bits. The SIG field 808a may be coded at BPSK-rate ½ repetition 2×.

TABLE 1

| Field | Bits | Description |
|---|---|---|
| Space Time Coding Block | 1 | May indicate whether Space Time Block Coding is used |
| Number of Spatial Streams | 2 | |

TABLE 1-continued

| Field | Bits | Description |
|---|---|---|
| Short Guard Interval | 1 | |
| Coding | 2 | $1^{st}$ bit may be coding type (LDPC/BCC) while $2^{nd}$ bit may be for LDPC $N_{sym}$ ambiguity |
| Modulation Coding Scheme (MCS) | 4 | |
| Aggregation Bit | 1 | Signals use of AMPDU |
| Length | 9 | My be in symbols when aggregation is on or in bytes when aggregation is off. An AMPDU may be required for packet sizes greater than 511 bytes |
| Reserved | 6 | May be used for MAC bits |
| CRC | 4 | |
| Tail | 6 | May be needed for BCC but could be less bits |

Figure 8B:
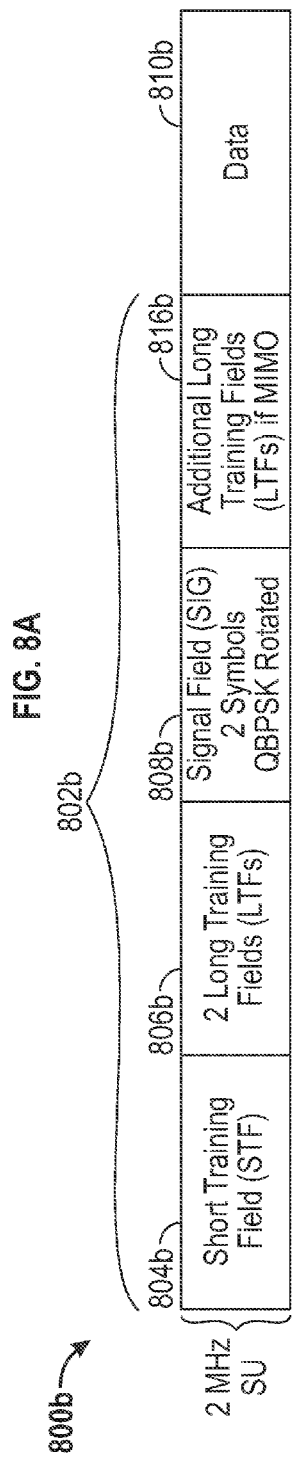
FIG. 8B is a block diagram showing an example structure of a preamble and payload of a physical layer packet for transmission over a bandwidth of substantially 2 MHz according to a single user mode.

FIG. 8B is a block diagram showing an example structure of a preamble 802b and payload 810b of a physical layer packet 800b for transmission over a bandwidth of substantially 2 MHz according to a single user mode. The physical layer packet 800b may be generated using a transform module 304 (FIG. 3) that is configured according to a 64 point FFT mode for transmitting an OFDM symbol with 64 tones as described above.

The preamble 802b may include a short training field (STF) 804b. The STF 804b may include a sequence of known values with a subset of non-zero values corresponding to a subset of non-zero tones over 64 tones with a determined periodicity. The periodicity of the non-zero tones may be the same as used for STF sequences used for 1 MHz transmissions. The preamble 802b may further include a long training field (LTF) 806b. The LTF 806b may be formed of two OFDM symbols and may include LTF sequences transmitted in each symbol. The LTF sequences may comprise non-zero values corresponding to non-zero tones for all pilot and data tones. The LTF sequences may therefore include 56 non-zero values in some implementations. The preamble 802b may further include a signaling field (SIG) 808b. The SIG field 808b may be formed from two OFDM symbols. The two OFDM symbols of the SIG field 808b may each be QBPSK rotated. If more than one spatial streams are being used, the preamble 802b may include additional long training fields (LTFs) 816b for each of the additional spatial streams being used (e.g., as the LTF 804b may correspond to the first spatial stream if there are more than one). The physical layer packet 800b may further include the payload 810b that may be generated using 52 tones in each OFDM symbol allocated for data. The preamble 802b may be used according to a single user mode.

Figure 8C:
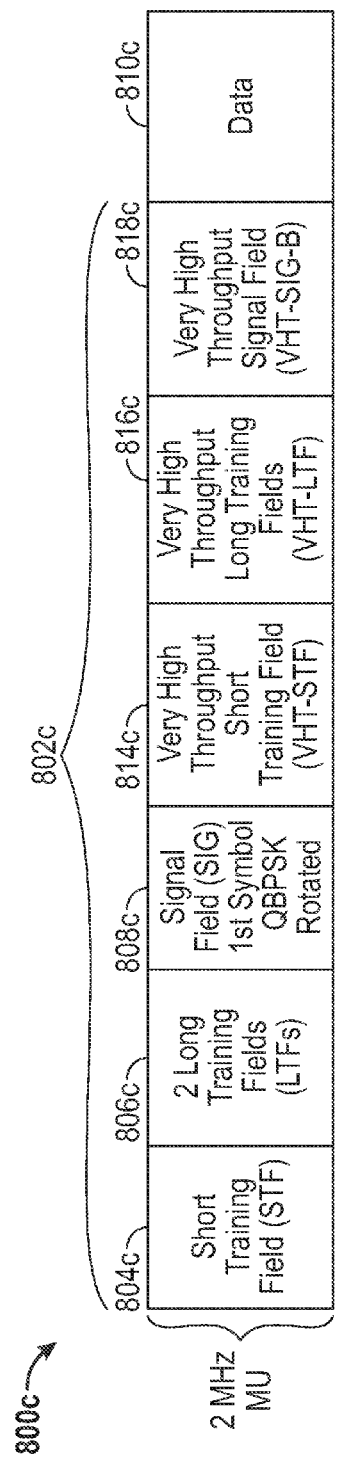
FIG. 8C is a block diagram showing an example structure of a preamble and payload of a physical layer packet for transmission over a bandwidth of substantially 2 MHz according to a multi user mode.

FIG. 8C is a block diagram showing an example structure of a preamble 802c and payload 810c of a physical layer packet 800c for transmission over a bandwidth of 2 MHz according to a multi-user mode. As described above with reference to FIG. 8B, the physical layer packet 800c may be generated using a transform module 304 (FIG. 3) that is configured according to a 64 point FFT mode for transmitting an OFDM symbol with 64 tones.

The preamble 802c may include a short training field (STF) 804c. The STF 804c may include a sequence of known values with a subset of non-zero values corresponding to a subset of non-zero tones over 64 tones with a determined periodicity. The periodicity of the non-zero tones may be the same as used for STF sequences used for 1 MHz transmissions. The preamble 802c may further include a long training field (LTF) 806c. The LTF 806c may be formed of two OFDM symbols and may include LTF sequences transmitted in each symbol. The LTF sequences may comprise non-zero values corresponding to non-zero tones for all pilot and data tones. The LTF sequences may therefore include 56 non-zero values according to some implementations. The preamble 802c may further include a signaling field (SIG) 808c. The SIG field 808c may be formed from two OFDM symbols. The first of the two OFDM symbols of the SIG field 808c may be QBPSK rotated. In one aspect, this allows for the receiver to detect whether the packet 800c is multi-user mode packet or a single user mode packet based on whether only one of the SIG field symbols is QBPSK rotated. The preamble 802c may further include a very high throughput short training field (VHT-STF) 814c. The VHT-STF 814c may correspond to a VHT-STF used for IEEE 802.11ac transmissions. The preamble 802c may further include one or more very high throughput long training fields (VHT-LTFs) 816c corresponding to each spatial stream being used. The VHT-LTFs 816c may correspond to VHT-LTFs used for IEEE 802.11ac transmissions. The preamble 802c may further include a very high throughput signal field (VHT-SIG-B) 818c. The VHT-SIG-B 818c may correspond to the VHT-SIG-B used for IEE 802.11ac transmissions. The physical layer packet 800c may further include the payload 810c that may be generated using 52 tones in each OFDM symbol allocated for data. The preamble 802c may be used according to a multi-user mode.

Differentiating between a 32 point mode (i.e., 1 MHz) and a 64 point mode (2 MHz) may be done by using an LTF sequence that is orthogonal in frequency across 32 and 64 tone mode, or by detecting the QBPSK rotation on the 1$^{st}$ SIG symbol.

As described above, a wireless device 202 of FIG. 2 may be configured to generate OFDM symbols for transmission over bandwidths greater than 2 MHz, such as for 4 MHz, 8 MHz, 16 MHz, and 32 MHz. In some implementations, when sending OFDM symbols over bandwidths greater than 2 MHz, the SIG field 808b (FIG. 8B) may be duplicated in every 2 MHz segment of the OFDM symbol and may be used to be able to determine the bandwidth of the symbol. As the OFDM symbol for the SIG field may use 52 tones allocated for data, duplication of the SIG field may leave 7 guard tones (3 and 4 tones on the ends of the symbol) for higher bandwidths (4 MHz, 8 MHz, 16 MHz).

In some cases, it may be desirable to use additional guard tones for the LTF 806b and/or SIG 808b fields (FIG. 8B). For example, it may be desirable for the 4 MHz, 8 MHz, and 16 MHz preamble symbols to correspond to corresponding symbols used for 40 MHz, 80 MHz, and 160 MHz of 802.11ac transmissions. As one example, the LTF 806b may use the VHT-LTFs for 40 MHz, 80 MHz, and 160 MHz 802.11ac transmissions depending on whether the OFDM symbol is for 4 MHz, 8 MHz, and 16 MHz respectively. As the VHT-LTFs for 40 MHz, 80 MHz, and 160 MHz have 11 guard tones (5/6), using these VHT-LTFs may not provide non-zero values for channel estimation for 2 tones at each edge, for example if the SIG 808b field allocated 52 tones for data. Furthermore, there may be stricter filtering requirements for symbols being transmitted using greater bandwidths (4 MHz, 8 MHz, and 16 MHz) if the LTF 806b and SIG 808b are transmitted using 52 data tones (i.e., having less guard tones). Duplicating the LTF 806b used for 2 MHz transmissions may inadequately address these issues as the LTF uses 52 non-zero tones, and thus the same guard tone issue remains. As such, an optimized LTF 806b and SIG 808b may be provided for 2, 4, and 8 MHz transmissions. In one aspect, the fields are chosen so as to be able to re-use 20, 40, and 80 MHz LTF sequences used for IEEE 802.11ac packets.

As such, in one implementation, for the 2 MHz packets shown in FIGS. 8B and 8C, the SIG fields 808b and 808c may be transmitted using a different tone allocation than the rest of the fields of the packets 800b and 800c. For example, The SIG fields 808b and 808c may be transmitted using 48 data tones rather than 52 data tones. This may correspond to the tone allocation used for an L-SIG of 802.11a tone allocation. This SIG field 808b and 808c may then be duplicated for each 2 MHz segment for transmissions over 2 MHz. In another implementation, the STFs 804b and 804c, the LTFs 806b and 806c, and the SIG fields 808b and 808c may be generated for transmission using a different tone allocation than the rest of the fields of the packet. For example the STFs 804b and 804c, the LTFs 806b and 806c, and the SIG fields 808b and 808c may be generated for transmission using 48 tones allocated for data.

As described above, the SIG fields 808b and 808c for a 2 MHz mode may use two symbols transmitting up to 52 bits of data. The entries into the SIG fields 808b and 808c may correspond to the entries shown in Table 2 below. The first 26 bits that are un-shaded may correspond to the first symbol while the last 26 bits that are shaded may correspond to the second symbol. It should be appreciated that while 52 bits of data are shown in the table below, however as described above, in some implementations, the SIG fields 808b and 808c may be sent using 48 data tones and as such the SIG field may correspond to 48 bits. In one corresponding implementation, the number of reserved bits shown in Table 2 below may be reduced so that 48 bits are sent or received.

TABLE 2

| Field | Bits | Description |
|---|---|---|
| Bandwidth | 2 | This may indicate a bandwidth mode (e.g., 2 MHz, 4 MHz, 8 MHz, or 16 MHz) |
| Reserved | 1 | |
| Space Time Block Coding | 1 | Indicated whether Space Time Block Coding is used |
| Nsts/GID/AID | 14 | For Single User (SU) Mode - 2 bits may indicate Nsts, 0-12 bits may indicate partial AID For Multi User (MU) Mode - 8 bits may indicate Nsts, 6 bit GID |
| Reserved | 1 | |
| Short Guard Interval (SGI) | 1 | |
| Coding | 2 | 1$^{st}$ bit may indicate a coding type for SU (or for user zero for MU) while 2$^{nd}$ bit may be used for LDPC Nsym ambiguity |
| Modulation Coding Scheme (MCS) | 4 | For MU mode, the first 3 bits may indicate coding type for users 1-3 while the last is reserved) |
| Beamformed | 1 | May indicate to the receiver if a beamforming steering matrix is applied to the waveform in a SU mode |
| Aggregation Bit | 1 | Reserved for MU |
| Length | 9 | Length field (in symbols when aggregation is on and in bytes when aggregation is off) May mandate AMPDU for packet sizes >511 bytes and for MU |
| Reserved | 4 | Doppler bit may be indicated here |
| Midamble/Doppler | 1 | |
| CRC | 4 | |
| Tail | 6 | May be needed for BCC |

FIG. 9 illustrates an example format of a packet 900. The packet 900 may comprise a PPDU for use in the wireless communication system 100 of FIG. 1. In some aspects, the packet 900 is used when the wireless device 202 (FIG. 2) is operating in a basic mode. In some aspects, the packet 900 is referred to as a basic packet. The packet 900 may be used for sensors, and may support operation in one or two bandwidths, for example, the two lowest bandwidths used according to the 802.11ah standard.

The packet 900 includes a preamble 910 and a payload 920. The preamble 910 includes a short training field (STF) 912, a long training field (LTF) 914, and a signal (SIG) field 916. In the aspect illustrated in FIG. 9, the SIG field 916 is referred to as an Omni-SIG. The payload 920 may include user information or data and directly follow the SIG field 916, as in the aspect illustrated in FIG. 9.

The STF 912 may comprise one or more sequences. In some aspects, the sequence in the STF 912 is repeated a plurality of times. The STF 912 may be used by the receiver 212 of the wireless device 202 (FIG. 2) to set or adjust a gain of a receive amplifier. For example, automatic gain control may be performed to set a gain of a LNA. Further, the receiver 212 or the wireless device 202 may use the STF 912 to detect a beginning of the packet 900. As shown, the STF 912 may comprise 2 symbols.

The LTF 914 may also comprise one or more sequences. The LTF 914 may be used by the processor 204, the signal detector 218, or the DSP 220 of the wireless device 202 (FIG. 2) to estimate a channel over which the packet 900 is received and/or to equalize symbols received in the payload 920. As shown, the LTF 914 may comprise one or two symbols.

The SIG field 916 may comprise information regarding parameters of the packet 900 and the payload 920. For example, the SIG field 916 may indicate a length of the packet 900 or a modulation coding scheme (MCS) of the payload 920. As shown, the SIG field 916 may comprise one or two symbols. The contents and format of the SIG field 916 are described in additional detail in this disclosure.

FIG. 10 illustrates an example format of a packet 1000. The packet 1000 may comprise a PPDU for use in the wireless communication system 100 of FIG. 1. In some aspects, the packet 1000 is used when the wireless device 202 (FIG. 2) is operating in an advanced mode. In some aspects, the packet 1000 is referred to as an advanced packet. The packet 1000 may be implemented for non-sensor uses and/or for uses that require more than two bandwidths. As will be discussed further below, the packet 1000 may support multi-user multiple input multiple output (MU-MIMO) communications.

The packet 1000 includes a preamble 1010 and a payload 1020. The preamble 1010 includes the STF 912, the LTF 914, and the SIG field 916 illustrated in FIG. 9. In contrast to the preamble 910, however, the preamble 1010 further includes an extension field 1012. In FIG. 10, the extension field 1012 is illustrated as an extension SIG field. In some aspects, the SIG field 916 indicates whether the extension field 1012 is included in a packet. Thus, the SIG field 916 may be used to distinguish between a basic packet and an advanced packet in some aspects. The payload 1020 may include user information or data, and may be configured similar to the payload 920. In some aspects, the payload 1020 may be longer than the payload 920.

The extension SIG field 1012 may comprise parameters of the packet 1000 or the payload 1020 in addition to the parameters included in the SIG field 916. In some aspects, the extension SIG field 1012 includes information that is not included in the SIG field 916. In some aspects, the extension SIG field 1012 includes information relating to the parameters in the SIG field 916, which information may be used to supplement the SIG field 916. The extension SIG field 1012 may comprise one or two symbols, and may be disposed between the SIG field 916 and the payload 1020. The contents and format of the extension SIG field 1012 are described in additional detail in this disclosure.

FIG. 11 illustrates an example format of a packet 1100. The packet 1100 may comprise a PPDU for use in the wireless communication system 100 of FIG. 1. In some aspects, the packet 1100 is used when the wireless device 202 (FIG. 2) is operating in an extended range (XR) mode. In some aspects, the packet 1100 is referred to as an extended range or XR packet. The packet 1100 may provide a robust preamble and data encoding so as to increase the range over which the packet 1100 may be correctly received and decoded.

The packet 1100 includes a preamble 1110 and a payload 1120. The preamble 1110 includes a short training field (STF) 1112, a long training field (LTF) 1114, and a signal (SIG) field 1116. In the aspect illustrated in FIG. 11, the SIG field 1116 is referred to as an Omni-SIG. The payload 1120 may include user information or data, and may be configured similar to the payload 920 or 1020. In some aspects, the payload 1120 may be shorter than the payload 920 or 1020.

Similar to the STF 912, the STF 1112 may comprise one or more sequences. The sequence included in the STF 1112, however, may be repeated a greater number of times than the sequence in the STF 912. The STF 912 may be used to set or adjust a gain of a receive amplifier or to detect a beginning of the packet 900. As shown, the STF 1112 may be longer than the STF 912. For example, the STF 1112 may comprise 3 symbols.

The format of the STF 1112 may be formatted in any number of ways. In one aspect, the format of the STF 1112 may be based on a Chui sequence. In some aspects, the format may be based on a quantum-dot cellular automata (QCA) design, for example by populating every tone with a 32 point fast Fourier transform (FFT). In other aspects, every other tone may be populated by a 64 point FFT.

The LTF 1114 may also comprise one or more sequences. The LTF 1114 may be used to estimate a channel over which the packet 1100 is received, and/or to equalize symbols received in the payload 1120. As shown, the LTF 1114 may be longer than the LTF 914. For example, the LTF 1114 may comprise two or more symbols. In some aspects, one of the symbols of the LTF 1114 is flipped when compared to a respective symbol in the LTF 914. The LTF 1114 may be repeated a plurality of times in some aspects.

The SIG field 1116 may comprise information regarding parameters of the packet 1100 and the payload 1120. For example, the SIG field 1116 may indicate a length of the packet 1100 or a modulation coding scheme (MCS) of the payload 1120. The SIG field 1116 may comprise two or more symbols. In some aspects, a plurality of bits representing sub-field of the SIG field 1116 are repeated four or more times in the SIG field 1116. For example, the SIG field 1116 may be represented by 19 bits, as will be discussed in further detail below, which bits may be repeated four times to occupy three symbols. In some aspects, the SIG field 1116 is modulated using a form of binary phase-shift keying (BPSK) such as BPSK 1/2. In some aspects, a different coding may be used instead of repetition of the bits or instead of using a binary convolutional code (BCC), which may reduce the length of the SIG field 1116, for example to two symbols. The different coding may include a block code. The contents and format of the SIG field 1116 are described in additional detail in this disclosure.

The wireless device 202*t* may be configured to determine which of the packets discussed in this disclosure to transmit. This determination may be based on any number of factors. For example, network congestion may be considered, as may the type or amount of data being transmitted.

In some aspects, the processor 204 of the wireless device 202 (FIG. 2) determines to transmit the packet 1000 instead of the packet 900 when MU-MIMO is used, when the length of the packet will be greater than a threshold amount, when a default mode is not being used for data, when the wireless device 202 is not operating at one of two lowest bandwidths, or when the forward error correction (FEC) being used is not BCC. In some aspects, the threshold amount is approximately 4096 bytes. In some aspects, the default mode relates to whether a short guard interval (SGI) or long guard interval (LGI) is being used.

The processor 204 of the wireless device 202 (FIG. 2) may further generate a packet, indicating whether the packet is formatted as the packet 900 or the packet 1000 with the SIG field 916. In some aspects, the wireless device 202 may rotate a modulation, such as the BPSK, of the SIG field 916 to indicate the type of the packet. In some aspects, a bit or other indicator may be transmitted over a quadrature phase (e.g. on the Q rail) during one of the symbols of the SIG field 916 to indicate whether the packet 900 or 1000 is being transmitted.

The processor 204 of the wireless device 202 (FIG. 2) may determine a formatting of a received packet based on the SIG field 916 and process the payload accordingly. For example, when the extension field 1012 is included in the preamble 1010, the wireless device 202 may decode or otherwise process the payload 1020 using parameters in the extension field 1012 such as an MCS or number of spatial streams. In some aspects, the wireless device 202 may be configured to decode packets having one of the formats 900 and 1000, and to ignore packets having the other format. For example, some devices may not implement multi-user (MU) functionality which utilizes information in the extension field 1012. If these devices determine that the extension field 1012 is included based on the SIG field 916, the processor 204 may cease further processing of the packet 1000 or abort receiving any further portion of the packet 1000. In this way, the device may identify packets that are not intended for the device, and may save power by aborting reception of those packets.

FIG. 12 illustrates an example 916*a* of the SIG field 916. The SIG field 916*a* may be used with the aspects described in this disclosure where the type of packet is indicated using a rotated BPSK or Q-rail bit, for example. The SIG field 916*a* comprises a length sub-field 1202 including 12 bits, an MCS sub-field 1204 including 4 bits, a bandwidth (BW) sub-field 1206 including 1 bit, a parity sub-field 1208 including 1 bit, a reserved sub-field 1212 including 2 bits, and a tail sub-field 1214 including 6 bits. The length sub-field 1202 may indicate a length of the packet 900 or 1000 in bytes. The MCS sub-field 1204 may indicate an MCS used for the payload 920, 1020. The bandwidth sub-field 1206 may indicate which bandwidth is being used. In the illustrated aspect, the SIG field 916*a* comprises one symbol.

In some aspects, a format of the packet generated by the processor 204 (FIG. 2) may be indicated by one or more sub-fields or bits in the SIG field 916. For example, when generating the packet, the processor 204 of the wireless device 202 (FIG. 2) may include an explicit indicator in the SIG field 916 to distinguish the packet 900 from the packet 1000. When another wireless device 202 receives the packet, the processor 204 of the wireless device 202 may determine a formatting of the packet based on a subfield of the SIG field 916 and process the payload accordingly.

In one aspect, the inclusion of the extension field 1012 is determined using a mode sub-field of the SIG field 916. The mode sub-field may comprise two bits and may be used to indicate a number of spatial streams or a number of bandwidth portions used for the packet. In some aspects, the packet 900 is utilized when the payload 920 is transmitted over one spatial stream. In some aspects, the packet 1000 is utilized when the payload 1020 is transmitted over more than one spatial stream. For example, the extension sub-field 1012 may be included when single user MIMO (SU-MIMO) or MU-MIMO is used. The mode sub-field is described in additional detail below.

FIG. 13A illustrates an example 916*b* of the SIG field 916. The SIG field 916*b* may be used in the packet 900 with the aspects described in this disclosure where the type of the packet is indicated using a subfield of the SIG field 916*b*, for example. The SIG field 916*b* comprises the length sub-field 1202, the MCS sub-field 1204, a mode sub-field 1302 as discussed above, a SGI sub-field 1304 including 1 bit, the parity sub-field 1208, and the tail sub-field 1214. In the aspect illustrated in FIG. 13A, the length sub-field 1202 may indicate a length of the packet 900 in bytes or symbols. The parity sub-field 1208 may only apply to the mode sub-field 1302 and the SGI sub-field 1304 in some aspects. In the illustrated aspect, the SIG field 916*b* comprises one symbol.

The following table illustrates example values of the mode sub-field 1302. The table further enumerates a number of spatial streams and bandwidths that may be used for each of the values of the mode sub-field 1302, and the table further describes whether the length of the packet 900 is described in the bytes or symbols in the length sub-field 1202.

TABLE 3

| Mode | | |
|---|---|---|
| "00" | Basic BW, 1 ss | Length in bytes |
| "01" | BW X 2, 1 ss | Length in symbols |
| "10" | BW X 4, 1 ss | Length in symbols |
| "11" | Ext SIG | Ext SIG present |

As can be seen from the table above, the length may be indicated in symbols when more than one bandwidth is used. In some aspects, an aggregate MAC protocol data unit (A-MPDU) is used when more than one bandwidth is used, the length of which may be sufficiently indicated in symbols. As can also be seen above, the extension field 1012 may be included when the mode sub-field 1302 is set to "1 1." Thus, the SIG field 916*b* may be used when the mode sub-field 1302 is set to "0 0," "0 1," or "1 0."

FIG. 13B illustrates an example 916*c* of the SIG field 916. The SIG field 916*c* may be used in the packet 1000 with the mode sub-field 1302 described above. Thus, the SIG field 916*c* may be used when the mode sub-field 1302 is set to "1 1" and the extension field 1012 is included. The SIG field 916*c* comprises a length sub-field 1312, a bandwidth sub-field 1314, a reserved sub-field 1316 including 4 bits, the mode sub-field 1302 as discussed above, the parity sub-field 1208, the SGI sub-field 1304, and the tail sub-field 1214. In the aspect illustrated in FIG. 13B, the length sub-field 1312 may indicate a length of the packet 1000 in symbols. In contrast to the length sub-field 1202, however, the length sub-field 1312 includes 10 bits. The bandwidth sub-field 1314 may indicate a number of bandwidths being used and may include 2 bits. In the illustrated aspect, the SIG field 916*c* comprises one symbol.

FIG. 14 illustrates an example 916*d* of the SIG field 916. The SIG field 916*d* may be used with the aspects described in this disclosure where the type of packet is indicated using a subfield of the SIG field 916d. For example, the inclusion of the extension field 1012 may be indicated by an MU-extension sub-field 1414. In the aspect illustrated in FIG. 14, the MU-extension sub-field 1414 includes one bit, may be set to "0" to indicate that the extension field 1012 is not included, and may be set to "1" to indicate that the extension field 1012 is included. In some aspects, the extension field 1012 comprises a SIG field and is included for MU transmissions. In such aspects, the extension field 1012 may be referred to as an MU-SIG. In the illustrated aspect, the SIG field 916d comprises two symbols.

The SIG field 916d comprises a rate sub-field 1402 including 4 bits, a spatial streams sub-field 1404, the short guard interval (SGI) sub-field 1304, a length sub-field 1406 including 18 bits, a cyclic redundancy check (CRC) sub-field 1408 including 4 bits, the tail sub-field 1214, a bandwidth sub-field 1412, the MU-extension sub-field 1414, an aggregation sub-field 1416 including 1 bit, and a reserved sub-field 1418. When the SIG field 916d is used for SU, the length sub-field 1406 may indicate a length of the packet 900 in bytes or octets. This allows the PHY layer to determine the boundary of the packet 900 when an A-MPDU is not used. When the SIG field 916d is used for MU, however, the length sub-field 1406 may indicate a maximum length of the packet 1000 among users in symbols. In this situation, an A-MPDU may be used with transmission of the packet 1000. Similar to the bandwidth sub-field 1314, the bandwidth sub-field 1412 may be used to indicate a number of bandwidths or modes being used, except that the bandwidth sub-field 1412 may include 2 or 3 bits.

In some aspects, the rate sub-field 1402 may indicate the MCS of the payload 920. The spatial streams sub-field 1404 may indicate a number of spatial streams for SU operation and/or number of spatial streams reserved for MU operation. The length sub-field may indicate the length of the packet 900 in octets if the MU extension sub-field 1414 is 0 and indicate length in symbols if the MU extension sub-field 1414 is 1. The aggregation sub-field 1416 may be reserved if the MU extension sub-field 1414 is 1 and may indicate the packet 900 is an A-MPDU if the MU extension sub-field 1414 is 0.

FIG. 15 illustrates an example 1012a of the extension field 1012. In the illustrated aspect, the extension field 1012a comprises a two symbol extension SIG field. The extension SIG field 1012a comprises an MCS sub-field 1502 including 16 bits, a length sub-field 1504 including 4 bits, a bandwidth sub-field 1506 including 1 bit, an SGI/LGI sub-field 1508 including 1 bit, a coding sub-field 1512 including 4 bits, a spatial streams sub-field 1514 including 8 bits, a group ID (GID) sub-field 1516 including 6 bits, a CRC sub-field 1518 including 4 bits, a reserved sub-field 1522 including 2 bits, and a tail sub-field 1524 including 6 bits.

The MCS sub-field 1502 may indicate an MCS for each of a plurality of users. In the illustrated embodiment, there may be up to four users. The length sub-field 1504 may indicate a length of the packet 1000 in symbols. The bandwidth sub-field 1506 may indicate a bandwidth used for the packet 1000. The SGI/LGI sub-field 1508 may indicate whether an SGI or LGI is used. The coding sub-field 1512 may indicate a coding for each of a plurality of users. In the illustrated embodiment, there may be up to four users. The spatial streams sub-field 1514 may indicate a number of spatial streams for each of a plurality of users. In the illustrated embodiment, there may be up to four users.

In some aspects, any of the MCS sub-field 1502, the length sub-field 1504, the bandwidth sub-field 1506, and the SGI/LGI sub-field 1508 may indicate a parameter of the packet 1000 rather than a corresponding sub-field in the SIG field 916 indicating that parameter. For example, when the extension field 1012a is included, the wireless device 202r may use the MCS sub-field 1502 to determine an MCS for one or more users instead of using the MCS sub-field 1204. In other aspects, one or more sub-fields in the SIG field 916 may indicate parameters for a first user, while any of the MCS sub-field 1502, the length sub-field 1504, the bandwidth sub-field 1506, and the SGI/LGI sub-field 1508 may indicate parameters for one or more other users.

In some aspects, the length of the packet 1000 is indicated by a combination of the bits in the length sub-field 1504 with the bits in a length sub-field of the SIG field 916. For example, the length sub-field 1312 may be set to the value "0000000010" and the length sub-field 1504 may be set to the value "1111" to indicate that a length of the packet 1000 is 47 symbols. Similarly, the number of bandwidths used for the packet 1000 may be indicated by a combination of the bit in the bandwidth sub-field 1506 with the bits of a bandwidth sub-field in the SIG field 916.

FIG. 16 illustrates an example 1012b of the extension field 1012. In the illustrated aspect, the extension field 1012b comprises a two symbol extension SIG field. The extension SIG field 1012b comprises the MCS sub-field 1502, the spatial streams sub-field 1514, the GID sub-field 1516, the CRC sub-field 1518, a reserved sub-field 1602 including 10 bits, and the tail sub-field 1524. As can be seen in FIG. 16, the extension SIG field 1012b is formatted similar to the extension SIG field 1012a, except that the sub-fields 1504-1512 are omitted in the extension SIG field 1012b, and the reserved sub-field 1602 includes a greater number of bits than the reserved sub-field 1522.

FIG. 17 illustrates an example format of a packet 1700. The packet 1700 may comprise a PPDU for use in the wireless communication system 100 of FIG. 1. In some aspects, the packet 1700 is used when the wireless device 202 (FIG. 2) is operating in the advanced mode, and the packet 1700 may be referred to as an advanced packet.

The packet 1700 includes a plurality of extension fields 1732-1738 in a preamble 1710 of the packet 1700. The extension fields may include an MU-SIG field 1732, a precoded STF 1734, one or more LTFs 1736, and a SIG-B field 1738. In some aspects, the packet 1700 may be used instead of the packet 1000.

In addition to the extension fields 1732-1738, the preamble 1710 includes a high throughput (HT) STF 1712, an HT-LTF1 1714, and the signal (SIG) field 916. In the aspect illustrated in FIG. 9, the SIG field 916 is referred to as an Omni-SIG. In some aspects, the SIG field 916 indicates whether the extension fields 1732-1738 are included in a packet. For example, one or more bits in the SIG field 916, a BPSK rotation of the SIG field 916, and/or a bit on the Q-rail during a symbol of the SIG field 916 may indicate that the extension fields 1732-1738 are included.

The HT-STF 1712 may comprise one or more sequences. In some aspects, the sequence in the STF 1712 is repeated a plurality of times. The HT-STF 1712 may be used by the receiver 212 of the wireless device 202 (FIG. 2) to set or adjust a gain of a receive amplifier or used to detect a beginning of the packet 1700. As shown, the HT-STF 1712 may comprise 2 symbols.

The HT-LTF 1714 may also comprise one or more sequences. The HT-LTF 1714 may be used by the processor 204, the signal detector 218, or the DSP 220 of the wireless device 202 (FIG. 2) to estimate a channel over which the packet 1700 is received and/or to equalize symbols received in a payload 1720. As shown, the HT-LTF 1714 may comprise two symbols.

In some aspects, the MU-SIG field 1732 includes one or more of the sub-fields illustrated in FIGS. 15 and 16. In some aspects, the MU-SIG field 1732 and the SIG-B field 1738 are collapsed together to create a two symbol field. When the MU-SIG field 1732 and the SIG-B field 1738 are collapsed, the combined contents may include a GID sub-field, an $N_{sts}$ (number of space time streams) sub-field, and/or an MCS sub-field. In some aspects, the MCS sub-field includes an MCS for each user. In some aspects, one or more of the SIG fields illustrated in FIG. 17 can be used as an additional LTF.

As alluded to above, the packet 1700 may further include the payload 1720. The payload 1720 may include user information or data, and may be configured similar to the payload 920.

Figure 18:
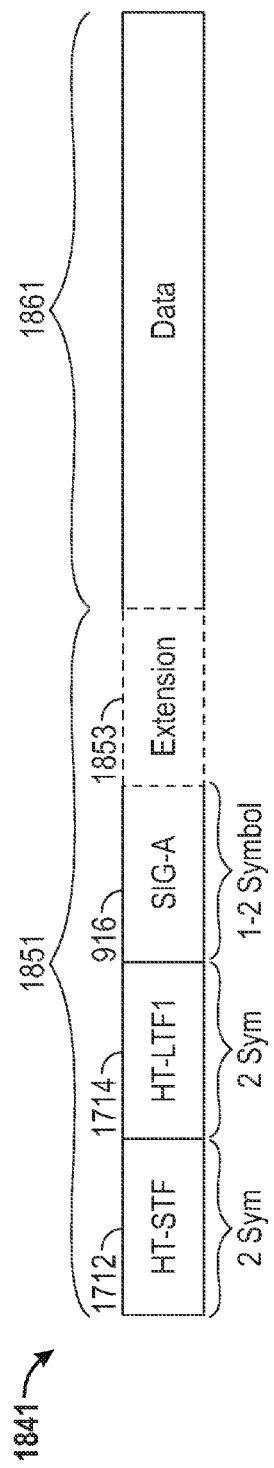
FIG. 18 illustrates an example packet format.

FIG. 18 illustrates an example generalized format of a packet 1841 which may be used within the wireless communication system 100 of FIG. 1. The packet 1841 may comprise a PPDU, and may be selectively formatted according to either the basic mode or advanced mode described above. In some aspects, the packet 1841 may be formatted according to a plurality of other modes.

The packet 1841 includes a preamble 1851 and a payload 1861. The preamble 1851 includes the HT-STF 1712, the HT-LTF 1714, and the SIG field 916. In some modes or formats, the packet 1841 may additionally include an extension 1853.

The HT-STF 1712 and the HT-LTF 1714 allow for data transmission on 52 tones. The extension 1853 may include one or more optional or extension fields. The SIG field 916 may be used to indicate whether the extension 1853 is included in the preamble 1851 and, when the extension 1853 is included, to indicate whether certain fields are included in the extension 1853. For example, for sensor transmissions using one spatial stream, the SIG field 916 may indicate that the extension 1853 is omitted and the SIG field 916 may be directly followed by the payload 1861. The payload 1861 may include SU data or MU data, and/or aggregated or non-aggregated MPDU information, for example, and may be configured similar to the payloads discussed in this disclosure.

In some aspects, the STF 912 discussed above with respect to FIG. 9 may be configured similar to the HT-STF 1712. Further, the LTF 914 discussed above with respect to FIG. 9 may be configured similar to the HT-LTF 1714.

The SIG field 916 is labeled as a SIG-A field in FIG. 18. In some aspects, the SIG-A field 916 may be configured similar to the Omni-SIG fields illustrated or discussed in this disclosure. In other aspects, the SIG-A field 916 may differ in configuration from the Omni-SIG fields illustrated or discussed in this disclosure. For example, the SIG-A field 916 may be configured as discussed with respect to FIGS. 20 and 23.

The packets discussed above may be formatted pursuant to the generalized format of the packet 1841. For example, when the extension 1853 is omitted, the packet 900 may be formatted similar to the packet 1841. As another example, when the extension 1853 is included, the packet 1000 may be formatted similar to the packet 1841. In this example, the extension field 1012 may be included in the extension 1853. Similarly, when the extension 1853 is included, the packet 1700 may be formatted similar to the packet 1841. In this example, one or more of the plurality of extension fields 1732-1738 may be included in the extension 1853.

The packet 1841 may be formatted to reduce overhead for devices that do not support or are not using MU-MIMO, for example, by omitting one or more fields from the extension 1853 or by omitting the extension 1853 altogether. Similarly, the extension 1853 or one or more fields of the extension may be omitted for devices that do not support or are not using SU transmit beamforming (Tx-BF). Thus, sensors and other such devices may utilize non-AMPDU transmissions. Therefore, the packet 1841, and the implementations of the packet 1841 described below, support both MU-MIMO and Tx-BF as optional features with little or no additional overhead for devices that do not support such features.

Figure 19A:
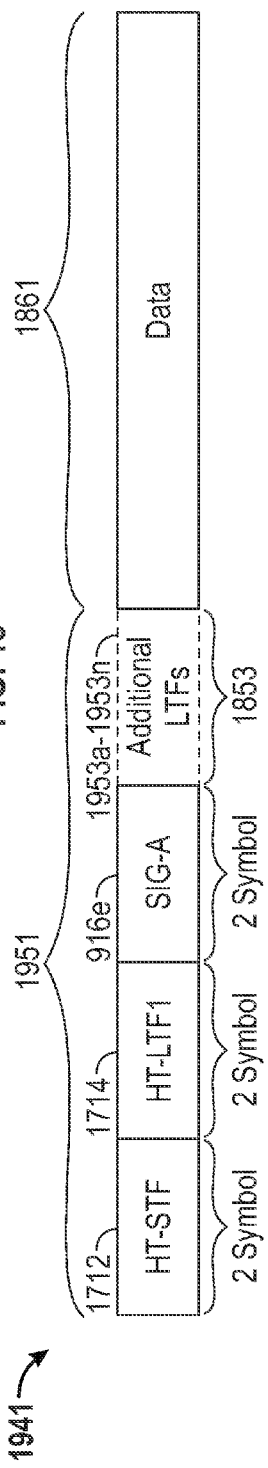
FIGS. 19A and 19B illustrate example formats of packets having one or more signal fields.
Figure 19B:
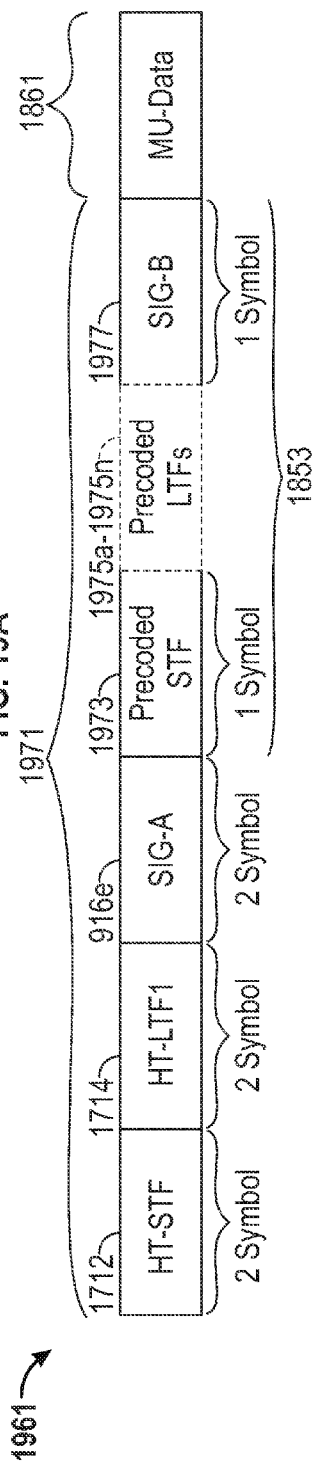

FIGS. 19A and 19B illustrate a first implementation showing a plurality of formats that may be used for the packet 1841 discussed above. Each of the formats illustrated in FIGS. 19A and 19B include the HT-STF 1712, the HT-LTF 1714, and an example 916e of the SIG field 916. The SIG-A field 916e may include two symbols.

FIG. 19A illustrates an example packet format 1941 of the packet 1841 according to the first implementation, and FIG. 19B illustrates an example packet format 1961 of the packet 1841 according to the first implementation. The wireless device 202 (FIG. 2) may distinguish between the packet 1941 and the packet 1961 based on the SIG-A field 916e, for example.

With reference to FIG. 19A, the packet 1941 includes a preamble 1951 and the payload 1861. The preamble 1951 includes the HT-STF 1712, the HT-LTF 1714, and the SIG-A field 916e discussed above. The preamble 1951 optionally includes one or more additional LTFs 1953.

In some aspects, the packet 1941 is used for SU open loop transmission. In such aspects, the additional LTFs 1953 are omitted when one spatial stream is used for the packet 1941. When additional spatial streams are used, an additional LTF 1953 for each additional spatial stream may be included in the preamble 1951. In some aspects, 1, 2, or 4 spatial streams may be used. In these aspects, 0, 1, or 2 additional LTFs 1953 will be included in the preamble 1951.

In some aspects, an indicator in the SIG-A 916e signifies whether the additional LTFs 1953 are included. An example of such an indicator is described with respect to FIG. 20.

With reference to FIG. 19B, the packet 1961 includes a preamble 1971 and the payload 1861. The preamble 1971 includes the HT-STF 1712, the HT-LTF 1714, and the SIG-A field 916e discussed above. The preamble 1971 further includes a precoded STF 1973 comprising one symbol, and a SIG field comprising one symbol. The precoded STF 1973 may be used in automatic gain control (AGC) process. In FIG. 19B, the SIG field is illustrated as a SIG-B field 1977. The preamble 1971 optionally includes one or more precoded LTFs 1975. The precoded LTFs 1975 may be used to for training purposes, for example, to estimate the channel over which the packet 1961 is received. Precoding may allow additional amounts of data to be transmitted per symbol. In some aspects, the SIG-B field 1977 is precoded.

In some aspects, the packet 1961 is used for MU-MIMO or Tx-BF transmission. Indicators in the SIG-A field 916e may be used to differentiate between such transmissions as will be discussed in additional detail below. In some aspects, the precoded LTFs 1975 are included when more than one spatial stream is used, similar to how the additional LTFs 1953 are included in the packet 1941 when more than one spatial stream is used. The inclusion or omission of the precoded LTFs 1975 may be indicated in the same way as the inclusion or omission of the additional LTFs 1953.

In some aspects, a modulation of at least one of the symbols of the SIG-A field 916e is used to identify whether the packet 1941 or the packet 1961 is being transmitted. For example, the wireless device 202t may transmit the first symbol of the SIG-A field 916e using a rotated BPSK. When the wireless device 202r receives the SIG-A field 916e, the wireless device 202r may determine that the packet 1961 is being received. In some aspects, a QBPSK rotation is used. Thus, a rotation of a symbol in the SIG-A field 916e may indicate that the precoded STF 1973 follows the SIG-A field 916e, as well as indicating that the SIG-B field 1977 is included in the preamble 1971.

In some uses of the wireless communication system 100 of FIG. 1, SU open loop transmissions will be used with a greater frequency than either MU-MIMO or Tx-BF transmissions. For example, certain sensors configured for 802.11ah transmission may use SU open loop transmission. Thus, in the first implementation, the packet 1941 may be used more often than the packet 1961, and the SIG-B field 1977 therefore omitted from many communicated packets.

FIG. 20 illustrates an example of the SIG-A field 916e. The SIG-A field 916e includes an MCS sub-field 2051 comprising 4 bits, a spatial streams sub-field 2053 comprising 2 bits, an SGI sub-field 2055 comprising 1 bit, a length sub-field 2057 comprising 12 bits, a bandwidth sub-field 2059 comprising 2 bits, an aggregation sub-field 2061 comprising 1 bit, a coding sub-field 2063 comprising 1 bit, an MU sub-field 2065 comprising 1 bit, a space-time block code (STBC) sub-field 2067 comprising 1 bit, an AID/GID sub-field 2069 comprising 16 bits, a reserved sub-field 2071 comprising 1 bit, a CRC sub-field 2073 comprising 4 bits, and a tail sub-field 2075 comprising 6 bits.

The MCS sub-field 2051 indicates an MCS used when the SIG-A field 916e is used in a SU transmission. The MCS sub-field 2051 is reserved for MU transmission because the MCS for an MU transmission may be indicated in the SIG-B field 1977. In some aspects, the SU transmission may be indicated by the symbols of the SIG-A field 916e being transmitted without a rotated modulation, or by the MU sub-field 2065 being set to zero when a symbol of the SIG-A field 916e is transmitted with a rotated modulation.

The spatial streams sub-field 2053 may indicate the number of spatial streams used in a SU transmission. When the spatial streams sub-field 2053 indicates that more than one spatial stream is used, the additional LTFs 1953 or precoded LTFs 1975 may be included. Thus, a value of the spatial streams sub-field 2053 may indicate whether one or more LTFs are included after the SIG-A field 916e, as well as how many of the additional LTFs are included. The spatial streams sub-field 2053 may be reserved for MU transmissions.

The length sub-field 2057 may indicate a length of the packet, or of the payload of the packet, in which the SIG-A field 916e is included. The length sub-field 2057 may indicate the length of the packet in bytes when a non-aggregated MPDU is used with SU transmission. This ensures that the PHY layer of the wireless device 202r may properly determine the length of the packet. If MU is used or if A-MPDU is used, the length sub-field 2057 indicates the length of the packet in symbols. In some aspects, A-MPDU is always used for MU transmission. In some aspects, A-MPDU is always used for packets having a length that is greater than 4095 bytes. When the length sub-field 2057 indicates the length in symbols, the length of the packet may be accurately determined because delimiters within the A-MPDU may carry an exact byte length. Further, the bandwidth sub-field 2059 may indicate a bandwidth used for the packet 1941 or the 1961, for example.

The aggregation sub-field 2061 indicates whether MPDUs are being aggregated when SU transmission is used. Thus, the aggregation sub-field indicates whether an A-MPDU is used, as well as indicates whether the length sub-field 2057 should be interpreted as bytes or symbols. The aggregation sub-field 2061 may be reserved for MU transmissions in some aspects.

The coding sub-field 2063 may indicate a coding for a plurality of users. The coding sub-field 2063 may indicate a coding type for SU, and may be reserved in the case of MU.

As alluded to above, the MU sub-field 2065 indicates whether the SIG-A field 916e is included an MU transmission or an SU transmission. In the illustrated aspect, a value of "1" in the MU sub-field 2065 indicates that MU is being used, while a value of zero indicates that SU is being used.

The STBC sub-field 2067 indicates STBC for some or all spatial streams. Further, the STBC sub-field 2067 may be used as in the 802.11ac standard.

The AID/GID sub-field 2069 will carry different information depending on whether MU or SU is being used. When MU transmissions are not being used, the AID/GID sub-field 2069 may indicate an association identifier (AID) of the device to which the packet carrying the SIG-A field 916e is directed. When MU transmission are being used, the AID/GID sub-field 2069 may indicate a group identifier (GID) of the devices to which the packet carrying the SIG-A field 916e is directed, as well as a number of spatial streams being used. When the AID/GID sub-field 2069 indicates that more than one spatial stream is used, the precoded LTFs 1975 may be included. Thus, a value of the AID/GID sub-field 2069 may indicate whether one or more precoded LTFs 1975 are included after the SIG-A field 916e, as well as how many of the precoded LTFs 1975 are included.

FIG. 21 illustrates an example 1977a of the SIG-B field 1977. The SIG-B field 1977a includes an MCS sub-field 2151 comprising 4 bits, a coding sub-field 2153 comprising 1 bit, a reserved sub-field 2155 comprising 11 bits, a CRC sub-field 2157 comprising 4 bits, and a tail sub-field 2159 comprising 6 bits. In some aspects, a SIG-B field 1977a is included for each user transmission. Thus, each of the sub-fields 2151-2159 may include information for one user.

In some aspects, the SIG-B field 1977 may be omitted for SU Tx-BF transmissions. This aspect, however, may involve an additional mode to properly receive a packet omitting the SIG-B field. Thus, rather than a wireless device implementing two modes, for example, the wireless device may implement three modes.

The first implementation discussed above with respect to FIG. 19 provides support for SU-MIMO, STBC, short GI, AID-based power save, and bandwidths using only the SIG-A field. The preamble for such communications may comprise only six symbols. Additional information may be included for MU-MIMO or Tx-BF in an extension field, for example, a SIG-B field or one or more additional LTFs.

Figure 22:
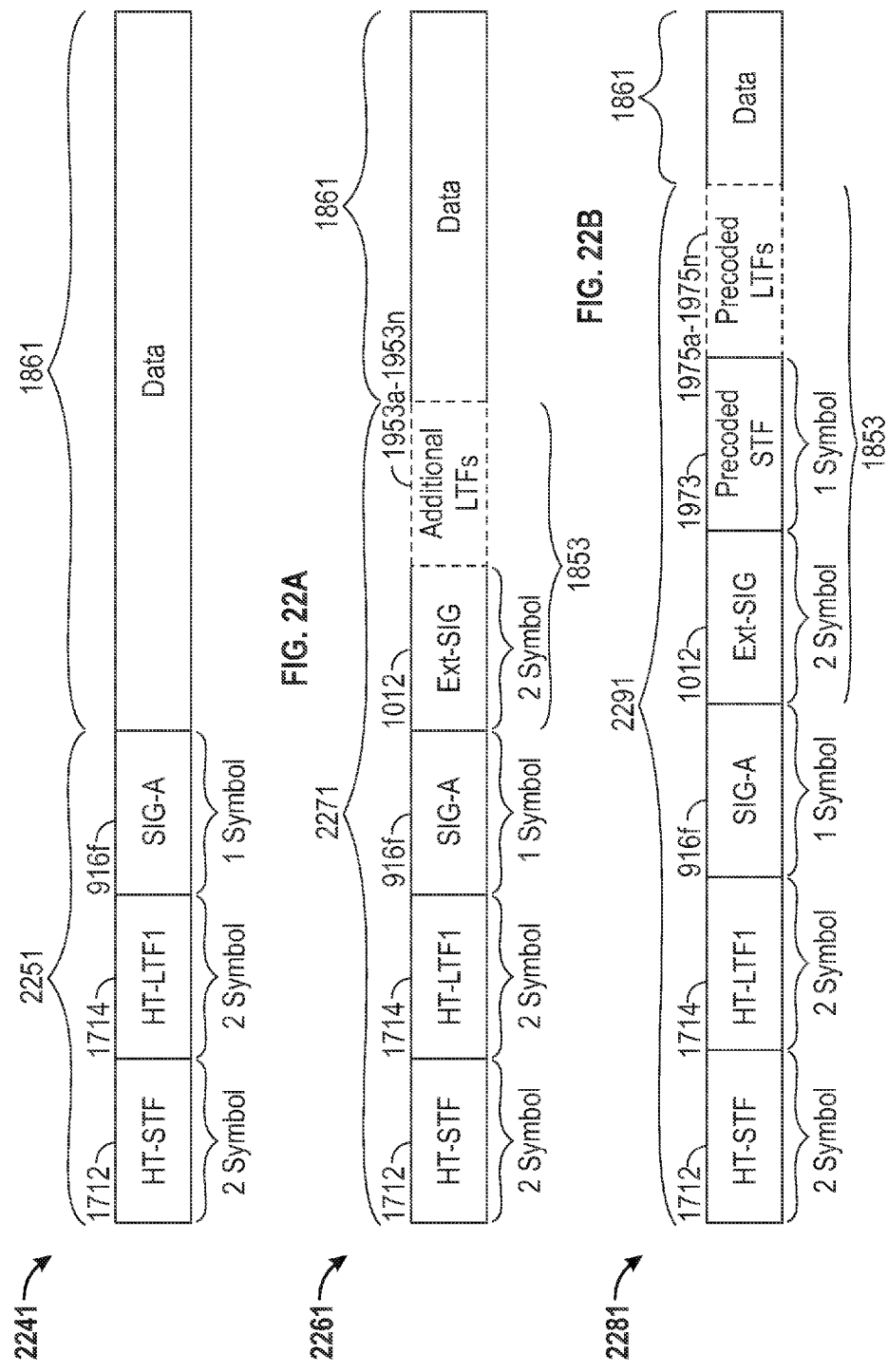
FIGS. 22A, 22B, and 22C illustrate example formats of packets having one or more signal fields.

FIGS. 22A, 22B, and 22C illustrate a second implementation showing a plurality of formats that may be used for the packet 1841 discussed above. Each of the formats illustrated in FIGS. 22A, 22B, and 22C includes the HT-STF 1712, the HT-LTF 1714, and an example 916f of the SIG field 916. The SIG-A field 916f includes one symbol.

FIG. 22A illustrates an example 2241 of a format of the packet 1841 according to the second implementation, FIG. 22B illustrates an example 2261 of another format of the packet 1841 according to the second implementation, and FIG. 22C illustrates an example 2281 of yet another format of the packet 1841 according to the second implementation. The wireless device 202r may distinguish between the packets 2241, 2261 and 2281 based on at least the SIG-A field 916f.

With reference to FIG. 22A, the packet 2241 includes a preamble 2251 and the payload 1861. The preamble 2251 includes the HT-STF 1712, the HT-LTF 1714, and the SIG-A field 916f discussed above. In some aspects, the packet 2241 is used for open loop transmissions over one spatial stream. For example, certain sensors configured for 802.11ah transmission may utilize the packet 2241.

With reference to FIG. 22B, the packet 2261 includes a preamble 2271 and the payload 1861. The preamble 2271 includes the HT-STF 1712, the HT-LTF 1714, the SIG-A field 916*f* discussed above, and the extension field 1012. In FIG. 22B, the extension field 1012 is illustrated as an extension SIG field comprising two symbols. The preamble 2271 optionally includes the one or more additional LTFs 1953.

In some aspects, the packet 2261 is used for open loop MIMO transmission. In such aspects, the additional LTFs 1953 are omitted when one spatial stream is used for the packet 2261. When additional spatial streams are used, an additional LTF 1953 for each additional spatial stream may be included in the preamble 2271. In some aspects, 1, 2, or 4 spatial streams may be used. In these aspects, 0, 1, or 2 additional LTFs 1953 will be included in the preamble 2271.

In some aspects, an indicator in the extension field 1012 signifies whether the additional LTFs 1953 are included. An example of such an indicator is described below with respect to FIG. 24.

With reference to FIG. 22C, the packet 2281 includes a preamble 2291 and the payload 1861. The preamble 2291 includes the HT-STF 1712, the HT-LTF 1714, the SIG-A field 916*f* discussed above, the extension field 1012, and the precoded STF 1973. In FIG. 22C, the extension field 1012 is illustrated as an extension SIG field comprising two symbols. The preamble 2291 optionally includes the one or more precoded LTFs 1975.

In some aspects, the packet 2281 is used for MU-MIMO or Tx-BF transmission. Indicators in the extension field 1012 may be used to differentiate between such transmissions, as will be discussed in additional detail below. In some aspects, the precoded LTFs 1975 are included when more than one spatial stream is used, similar to how the additional LTFs 1953 are included in the packet 2261 when more than one spatial stream is used. The inclusion or omission of the precoded LTFs 1975 may be indicated in the same way as the inclusion or omission of the additional LTF 1953.

In some aspects, a modulation of the SIG-A field 916*f* is used to identify whether the packet 2241 or either of the packets 2261, 2281 is being transmitted. For example, the wireless device 202*t* may transmit the SIG-A field 916*f* using a rotated BPSK. When the wireless device 202*r* receives the SIG-A field 916*f*, the wireless device 202*r* may determine that either the packet 2261 or the packet 2281 is being received. In order to differentiate between the packet 2261 and 2281, the wireless device 202*r* may evaluate the extension field 1012. In some aspects, a QBPSK rotation is used to delineate between the packet 2241 and either of the packets 2261, 2281. Thus, a rotation of the SIG-A field 916*f* may indicate that the extension field 1012 follows the SIG-A field 916*e*. The extension field 1012 may indicate whether an additional LTF 1953, a precoded STF 1973, or the payload 1861 is next.

In some aspects, the processor 204 of the wireless device 202 (FIG. 2) determines to include the extension field 1012 when MIMO, MU-MIMO, STBC, or SU-BF is used. In some aspects, the processor 204 of the wireless device 202 determines to include the extension field 1012 when the packet being transmitted is greater than 4096 bytes, a short GI is used, or a low-density parity-check (LDPC) code is used. Thus, the extension field 1012 may be included for certain open loop SU modes (e.g. short GI, STBC, MIMO, aggregation). In some aspects, A-MPDU is used when the extension field 1012 is included, and aggregation is not used when the extension field 1012 is omitted.

As discussed above, an open loop transmission may be used in the wireless communication system 100 of FIG. 1. For example, certain sensors configured for 802.11ah transmission may use an open loop transmission. Thus, in the second implementation, a packet including only five symbols in the preamble (e.g. the packet 2241) may be used for typical sensor transmissions.

FIG. 23 illustrates an example of the SIG-A field 916*f*. The SIG-A field 916*f* includes a length sub-field 2351 comprising 12 bits, an MCS sub-field 2353 comprising 4 bits, the bandwidth sub-field 2059, a reserved sub-field 2355 comprising 1 bit, a parity sub-field 2357 comprising 1 bit, and the tail sub-field 2075.

The length sub-field 2351 may indicate a length of the packet, or of the payload of the packet, in which the SIG-A field 916*f* is included. The length field 2351 may indicate the length of the packet in when the extension field 1012 is omitted. When the extension field 1012 is included, the length may be indicated in symbols. As discussed above, the inclusion of the extension field 1012 may be indicated by BPSK rotation of the SIG-A field 916*f*. Thus, a modulation rotation of the SIG-A field 916*f* may delineate whether the length field 2351 should be interpreted as bytes or symbols.

The MCS sub-field 2353 indicates an MCS used for a user. If SU is being used, the MCS is for the single user. If MU is being used, the MCS is for one of the multiple users, for example, the first user.

FIG. 24 illustrates an example 1012*c* of the extension field 1012. In the illustrated aspect, the extension field 1012*c* comprises a two symbol extension SIG field. The extension SIG field 1012*c* includes an MCS sub-field 2451 comprising 12 bits, an $N_{sts}$ sub-field 2453 comprising 8 bits, a BF sub-field 2455 comprising 1 bit, an SGI/LGI sub-field 2457 comprising 1 bit, a coding sub-field 2459 comprising 4 bits, an STBC sub-field 2461 comprising 1 bit, a GID sub-field 2463 comprising 6 bits, a CRC sub-field 2465 comprising 4 bits, a reserved sub-field 2467 comprising 9 bits, and a tail sub-field 2469 comprising 6 bits.

For MU transmissions, the MCS sub-field 2451 may indicate an MCS for each of a plurality of users. In the illustrated aspect, there may be up to three users. As discussed above, an MCS for one user may be included in the SIG-A field 916*f*. The MCSs in the MCS sub-field 2451 may be for users in addition to the user for which the MCS is included in the SIG-A field 916*f*. Thus, between the SIG-A field 916*f* and the extension SIG field 1012*c*, MCS for four different users may be included.

For MU transmission, the $N_{sts}$ sub-field 2453 may indicate a number of spatial streams being used. For SU transmissions, however, the MCS sub-field 2451 in combination with the $N_{sts}$ sub-field 2453 may be used to indicate an AID of the single user. For example, the bits of the MCS sub-field 2451 and six bits of the $N_{sts}$ sub-field 2453 may carry the AID.

The BF sub-field 2455, the SGI/LGI sub-field 2457, and the STBC sub-field 2461 may indicate whether beamforming is being used, whether an SGI or LGI is being used, and whether STBC is being used, respectively. Thus, the BF sub-field 2455 may be used to distinguish between SU open loop transmissions and SU-BF transmissions.

The GID sub-field 2463 may indicate a GID for devices to which a packet including the extension SIG field 1012*c* is addressed. In some aspects, a value of the GID sub-field 2463 is reserved for SU open loop transmissions and/or a value of the GID sub-field 2463 is reserved for SU-BF transmissions. In such aspects, SU open loop an SU-BF transmissions may be distinguished without evaluating the BF sub-field 2455. In some such aspects, the BF sub-field 2455 is omitted.

The coding sub-field 2459 may indicate a coding for each of a plurality of users. In the illustrated aspect, there may be up to four users. In one aspect, each bit of the coding sub-field 2459 indicates a coding used for a respective user.

In some aspects, the SGI/LGI sub-field 2457 and/or the STBC sub-field 2461 may be included in the SIG-A field 916*f* rather than the extension SIG field 1012*c*. The STBC sub-field 2461 indicates an STBC for some or all spatial streams.

FIGS. 25A and 25B illustrate another implementation showing a plurality of formats that may be used for the packet 1841 discussed above. Each of the formats illustrated in FIGS. 25A and 25B include an STF 912, an LTF 914, and a SIG-A field 916. In this example, the LTF 914 and the SIG-A field 916 each include four symbols. FIG. 25A illustrates an example of a format of a packet, and FIG. 25B illustrates an example of another format of a packet. The wireless device 202*r* may distinguish between the packets of FIGS. 25A and 25B based on at least the LTF field 914.

With reference to FIG. 25A, the packet 2500 includes a preamble 2510 and the payload 2520. The preamble 2510 includes STF 912, LTF 916, and SIG-A field 916. The SIG-A field 916 may be repetition coded. These fields may be similar to the corresponding fields discussed in this disclosure. In some aspects, the packet 2500 is used for open loop transmissions over one spatial stream. For example, certain sensors configured for 802.11ah transmission may utilize the packet 2500.

With reference to FIG. 25B, the packet 2550 includes a preamble 2560 and the payload 2520. The preamble 2560 includes STF 912, LTF 914, SIG-A field 916, and extension field 1012. The SIG-A field 916 may be repetition coded. These fields may be similar to the corresponding fields discussed in this disclosure. In FIG. 25B, the extension field 1012 is illustrated as an extension SIG field comprising three symbols.

In some aspects, the packet 2550 is used when advanced features, such as open loop MIMO transmission, LDPC, single-user MIMO, Midamble, STBC, and PAID are used or when the payload is greater than 511 bytes. The extension field 1012 of the packet 2550 may communicate information for the advanced features. In some aspects, an indicator in the LTF field 914 signifies whether the extension SIG field 1012 are included. An example of such an indicator is described below with respect to FIG. 26.

FIG. 26 illustrates an example of the SIG-A field 916*g*. In the illustrated aspect, the SIG field 916*g* comprises four symbols. The SIG-A field 916*g* includes a Length sub-field 2651 comprising 9 bits, an MCS sub-field 2653 comprising 4 bits, an SGI sub-field 2655 comprising 1 bit, a 4-bit CRC sub-field 2657, and a 6-bit tail field 2659. In some embodiments, instead of the 4-bit CRC sub-field 2657, 1 parity bit and 3 reserved bits may be included. Alternatively, in some aspects, rather than the 4-bit CRC sub-field 2657, 1 parity bit, 2 reserved bits, and 1-bit Doppler/Midamble sub-field may be included.

The Length sub-field 2651 may indicate a length of the packet, or of the payload of the packet, in which the SIG-A field 916*g* is included. The Length sub-field 2651 may indicate the length of the packet in bytes when the extension field 1012 is omitted. When the extension field 1012 is included, the length may be indicated in symbols. Whether the extension SIG field 1012 is included in the packet may be indicated by symbol rotation of the LTF field 914 or a portion of the LTF field 914. For example, rotations of the last two symbols of the LTF field 914 may indicate whether or not the extension SIG field 1012 is included. Thus, a modulation rotation of the LTF field 914 may delineate whether the Length sub-field 2651 should be interpreted as bytes or symbols.

The MCS sub-field 2653 may indicate a MCS for a user. If SU mode is being used, the MCS may be for the single user. If MU mode is being used, the MCS may be for one of the multiple users, for example, the first user. The SGI sub-field 2655 may indicate where the short guard interval is used. For instance, a short guard interval may be 2 μs and a normal guard interval may be 8 μs. In some aspects, a short guard interval may be 2 μs and a normal guard interval may be 4 μs.

The SIG-A field 916*g* may include the information needed for 1 ss sensor traffic for payloads up to 511 bytes and include the information needed for deferral. Therefore, devices not implementing advanced features may shut-off after decoding the SIG-A field to save power.

FIG. 27 illustrates an example of the extension field 1012*d*. In the illustrated example, the extension field 1012*d* comprises a three symbol extension SIG field. The extension SIG field 1012*d* includes a 2-bit SS sub-field 2751, a 1-bit Doppler/Midamble sub-field 2753, a 2 bit Coding sub-field 2755, a 5-bit PAID (partial association identifier) sub-field 2757, a 1-bit STBC sub-field 2759, 1 parity sub-field 2761, and 6 tail sub-field 2763.

The num SS sub-field 2751 may indicate the number of spatial streams used. The Doppler/Midamble sub-field 2753 may be included to indicate that the receiver should mitigate the impact of high temporal channel variation, or to indicate the presence of a midamble. The coding sub-field 2755 may indicate a coding for each of a plurality of users. In the illustrated aspect, there may be up to four users. In one aspect, each bit of the coding sub-field 2755 may indicate a coding used for a respective user.

The PAID sub-field 2757 includes a partial identifier for one or more receivers. The PAID sub-field 2757 may be used by each receiver 202*r* as an early indicator of whether the receiver should receive and decode the remainder of the packet. For example, if the PAID sub-field 2757 indicates that the packet is not intended for a particular receiver, the particular receiver may discontinue processing the packet in order to save power. The STBC sub-field 2759 may indicate an STBC for one or more spatial streams. In some aspects, the parity sub-field 2761 covers only the extension SIG field 1012*d*.

In some aspects, a SGI bit can be included in the extension SIG field 1012*d* instead of in the SIG-A field 916*g*, and the Doppler/Midamble bit can be included in the SIG-A field 916*g* instead of in the extension SIG field 1012. In some embodiments, the extension SIG field 1012*d* includes four symbols. In such embodiments the additional symbol may be included, for example, for reserved bits and/or additional PAID bits. The additional symbol may alternatively include other sub-fields.

The packets 2500 and 2550 of FIGS. 25A and 25B are particularly advantageous for 1 MHz transmission modes. The packet of FIG. 25A may be sufficient for most traffic. In some embodiments, the longer packets of FIG. 25B are used only when advanced features are used.

In some embodiments, the packets 2500 and 2550 of FIGS. 25A and 25B have alternate configurations. For example, in some embodiments, the SIG-A field 916*g* may be three symbols in length and the extension field 1012*d* may be only one symbol. In such embodiments, the three symbol SIG-A field 916*g* of may include a Length sub-field 2651 comprising 9 bits, an MCS sub-field 2653 comprising 3 or 4 bits, a 1 or 0 bit Coding sub-field 2755, a SGI sub-field 2655 comprising 1 bit, and a 4-bit CRC sub-field 2657. In some aspects, tail bits may be omitted when tail-biting convolutional codes are used. Further, a one symbol extension field 1012*d* may comprise a 2-bit SS sub-field 2751, a 1-bit Doppler/Midamble sub-field 2753, a 1 bit Coding sub-field 2755, a 1-bit STBC sub-field 2759, and 1 parity sub-field 2761.

In some aspects, a payload, such as the payload 2520 of FIGS. 25A and 25B, may be repetition coded. Whether the payload is repetition coded may be indicated by symbol rotation of the LTF field 914 or a portion of the LTF field 914. For example, BPSK rotations of the last two symbols of the LTF field 914 may indicate whether the payload is BPSK rate ½ coded or is BPSK rate ½ repetition coded. In some embodiments, if the rotation of the LTF field 914 indicates that the payload is BPSK rate ½ repetition coded, bits in a field of a preamble that may otherwise be used to indicate MCS of the payload may be used for another purpose, such as, but not limited to reserved bits, parity bits, or a CRC field. In some embodiments, a preamble includes a SIG field, which may be BPSK rate ½ 2× repetition encoded whenever the payload is BPSK rate ½ 2× repetition encoded, and may be BPSK rate ½ encoded whenever the payload is not BPSK rate ½ 2× repetition encoded.

FIG. 28 illustrates an aspect of a method 2800 for transmitting a packet. The method 2800 may be used to selectively generate the packets discussed in this disclosure, such as packets 700, 800*a*, 800*b*, 800*c*, 900, 1941, 2241, 1000, 1700, 1941, 1961, 2261, 2281, for example. The packet may be generated at the AP 104 or the STA 106 and transmitted to another node in the wireless network 100. Although the method 2800 is described below with respect to elements of the wireless device 202*t*, other components may be used to implement one or more of the steps.

At block 2802, it is determined whether to include an extension field in a physical layer preamble of a communication. The extension field may comprise an extension SIG field and/or a SIG-B field, for instance. In some aspects, a plurality of extension fields may be included. The determination may be performed by the processor 204 and/or the DSP 220, for example. In some aspects, the processor 204 determines to include the extension field when MU-MIMO is used, when the length of the packet will be greater than a threshold amount, when a default mode is not being used for data, when the wireless device 202*t* is not operating at one of two lowest bandwidths, or when the forward error correction (FEC) being used is not BCC.

At block 2804, the communication is generated. The communication may comprise the physical layer preamble and a payload, and the preamble may include a first field indicating whether the extension field is included. The first field may comprise a SIG field, for example, a SIG-A field. The inclusion of the extension field may be indicated, for example, by one or more bits in the SIG field, a BPSK rotation of the SIG field, and/or a bit on the Q-rail during a symbol of the SIG field. The generation may be performed by the processor 204 and/or the DSP 220, for instance. In some aspects, the processor 204 includes coding parameters for the payload in the first field when it is determined not to include the extension field, and includes coding parameters for the payload in the extension field when it is determined to include the extension field. In some aspects, the coding parameters in an MCS may be for one or more users.

At block 2806, the packet is wirelessly transmitted. The transmission may be performed by the transmitter 210, for example.

Figure 29:
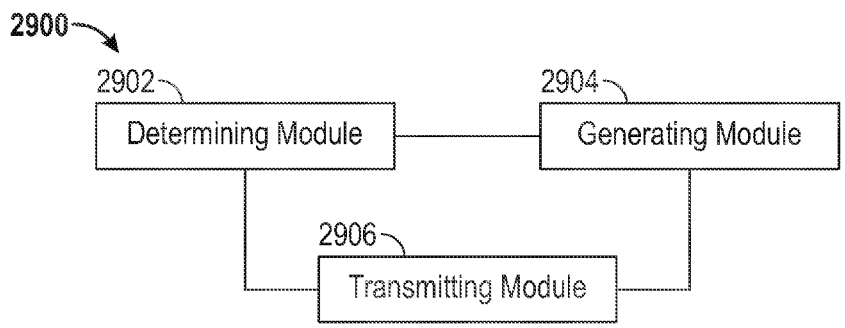
FIG. 29 is a functional block diagram of an example wireless device that may be employed within the wireless communication system of FIG. 1.

FIG. 29 is a functional block diagram of an example wireless device 2900 that may be employed within the wireless communication system 100 of FIG. 1. The device 2900 comprises a determining module 2902 for determining whether to include an extension field in a physical layer preamble of a communication. The determining module 2902 may be configured to perform one or more of the functions discussed above with respect to the block 2802 illustrated in FIG. 28. The determining module 2902 may correspond to one or more of the processor 204 and the DSP 220 of FIG. 2, for instance. The device 2900 further comprises a generating module 2904 for generating the communication. The generating module 2904 may be configured to perform one or more of the functions discussed above with respect to the block 2804 illustrated in FIG. 28. The generating module 2904 may correspond to one or more of the processor 204 and the DSP 220, for instance. The device 2900 further comprises a transmitting module 2906 for wirelessly transmitting the generated communication. The transmitting module 2906 may be configured to perform one or more of the functions discussed above with respect to the block 2806 illustrated in FIG. 28. The transmitting module 2906 may correspond to the transmitter 210 of FIG. 2, for instance.

Figure 30:
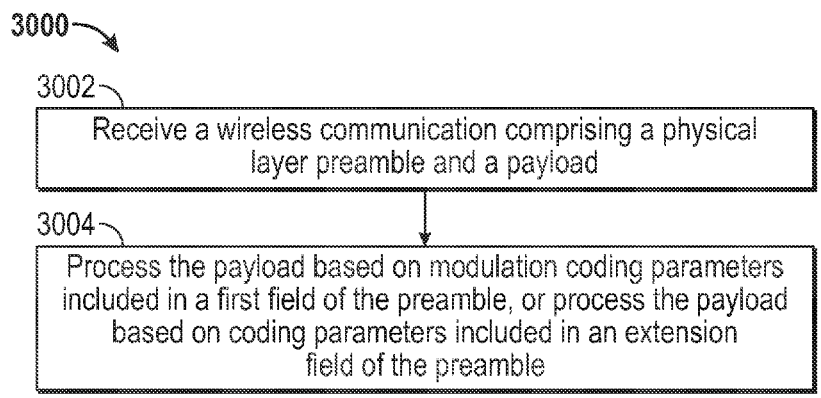
FIG. 30 illustrates an aspect of a method for receiving a packet.

FIG. 30 illustrates an aspect of a method 3000 for receiving and processing a packet. The method 3000 may be used to receive and process the packets discussed in this disclosure, such as packets 700, 800*a*, 800*b*, 800*c*, 900, 1941, 2241, 1000, 1700, 1941, 1961, 2261, 2281, for example. The packet may be received at either the AP 104 or the STA 106 from another node in the wireless network 100 of FIG. 1. Although the method 3000 is described below with respect to elements of the wireless device 202*r*, other components may be used to implement one or more of the steps.

At block 3002, a wireless communication comprising a physical layer preamble and a payload is received. The reception may be performed by the receiver 212, for example. In some aspects, the preamble includes a first field indicating whether the preamble also includes an extension field. The first field may comprise a SIG field, for example, a SIG-A field. The inclusion of the extension field may be indicated, for example, by one or more bits in the SIG field, a BPSK rotation of the SIG field, and/or a bit on the Q-rail during a symbol of the SIG field. The extension field may comprise an extension SIG field and/or a SIG-B field. In some aspects, a plurality of extension fields may be included.

At block 3004, the payload is processed based on modulation coding parameters included in the first field when the indicator signifies that the preamble does not include the extension field, and based on coding parameters included in the extension field when the indicator signifies that the preamble includes the extension field. The processing may be performed by the processor 204, the signal detector 218, and/or the DSP 220, for example. In some examples, the payload is processed using an MCS included in the first field and/or the extension field. In some aspects, when the extension field is included, the payload is processed by combining one or more sub-fields of the first field with one or more sub-fields of the extension field. In some aspects, the payload is processed for a plurality of users based on information in the extension field.

Figure 31:
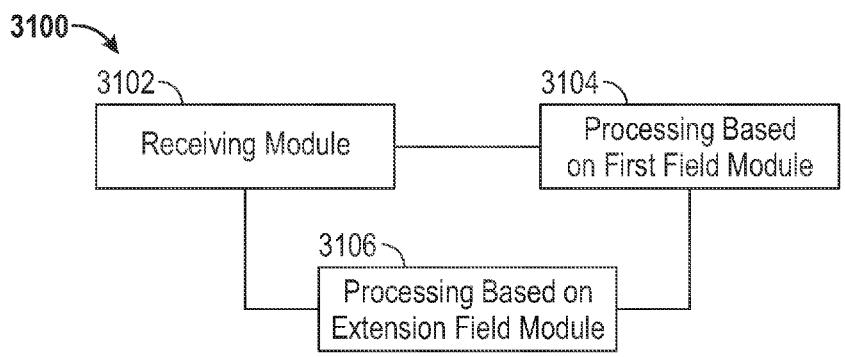
FIG. 31 is a functional block diagram of an example wireless device that may be employed within the wireless communication system of FIG. 1.

FIG. 31 is a functional block diagram of an example wireless device 3100 that may be employed within the wireless communication system 100 of FIG. 1. The device 3100 comprises a receiving module 3102 for wirelessly receiving a wireless communication comprising a physical layer preamble and a data unit. In some aspects, the preamble includes a first field indicating whether the preamble also includes an extension field. The receiving module 3102 may be configured to perform one or more of the functions discussed above with respect to the block 3002 illustrated in FIG. 30. The receiving module 3002 may correspond to the receiver 212 of FIG. 2, for example. The device 3100 further comprises a processing module 3104 for processing the payload based on modulation coding parameters included in the first field. The processing module 3104 may be configured to perform one or more of the functions discussed above with respect to the block 3004 illustrated in FIG. 30. The processing module 3104 may correspond to one or more of the processor 204, the signal detector 218, and the DSP 220 of FIG. 2, for example. The device 3100 further comprises a processing module 3106 for processing the payload based on coding parameters included in the extension field. The processing module 3104 may be configured to perform one or more of the functions discussed above with respect to the block 3004 illustrated in FIG. 30. The processing module 3106 may correspond to one or more of the processor 204, the signal detector 218, and the DSP 220 of FIG. 2, for example.

FIG. 32 illustrates various components that may be utilized in the receiver 212 of the wireless device 202 of FIG. 2. The components illustrated in FIG. 32 may be used to receive and distinguish between packets, for example, such as the packets 900, 1000 and the packet 1100.

In the aspect illustrated in FIG. 32, the receiver 212 comprises a first detector 3202 and a second detector 3204. The first detector 3202 is configured to detect the STF 912 of FIG. 9, for instance. The second detector 3204 is configured to detect the STF 1112 of FIG. 11, for instance. The first detector 3202 and the second detector 3204 may run in parallel to detect a packet and the format of the packet.

By using both the first detector 3202 and the second detector 3204, the receiver 212 may auto-detect whether the packet 1100 is received, or whether the packets 900, 1000 are received. If the first detector 3202 detects that the packet 900 or 1000 is being received, the wireless device 202r may use one or more of the mechanisms described in this disclosure to determine whether the packet 900 or the packet 1000 is being received. The payload of a received packet may be processed based on which of the packets 900-1100 are received and based on a SIG and/or extension field in the received packet. In this way, the wireless device 202r may be configured to receive and process packets that are formatted in multiple configurations as illustrated in FIGS. 9-11, for example.

The processor of the wireless device 202t may be configured to select, for instance, between the packets 900, 1000, and the packet 1100 based on which packet includes a sequence repeated a greater number of times than in the packets 900 and 1000. Thus, a longer, more robust STF and/or preamble may be transmitted when advantageous while maintaining the STF and/or preamble at an efficient length in other transmissions.

In addition to or in place of the STF detection described in this disclosure, the wireless device 202r may distinguish, for instance, between the packets 900, 1000 and the packet 1100 using an auto-detect procedure of the LTF. For example, when one of the symbols of the LTF 1114 is flipped when compared to a respective symbol in the LTF 914, as described in this disclosure, the wireless device 202r may detect whether a received packet is formatted as the packet 900 or 1000, or as the packet 1100. In some such aspects, the STF may be formatted similarly in different packet formats. For example, the STF 912 in the packets 900 and 1000 may be replaced by the STF 1112 in the packet 1100. In these aspects, a single detector may be implemented in the receiver 212 to detect the start of a packet using the STF and the type of packet using the LTF. In these aspects, however, packets may use the extended STF 1112, which may increase the length of the preamble.

FIG. 33 illustrates an example 1116a of the SIG field 1116. The SIG field 1116a comprises a length sub-field 3302 including 10 bits, a repetition factor sub-field 3304 including 1 bit, a parity sub-field 3306 including 1 bit, a reserved sub-field 3308 including 1 bit, and a tail sub-field 3312 including 6 bits. The length sub-field 3302 may indicate a length of the packet 1100 in bytes. The repetition factor sub-field 3304 may indicate a number of times that the plurality of bits in the SIG field 1116a is repeated. In the illustrated aspect, the repetition factor sub-field includes a bit which may be used to indicate whether the plurality of bits in the SIG field 1116 is repeated two times or four times. If an 8× downclock factor is used for the preamble 1110 and the plurality of bits may be repeated twice, the PHY rate may be approximately 400 Kbps. In such an aspect, transmitting 1024 bytes may take more than approximately 20 milliseconds.

The packets and fields illustrated in FIGS. 7-27 and 33 are examples and are not limiting on any of the packets or fields discussed in this disclosure. The packets and fields illustrated in FIGS. 7-27 and 33 may include one or more additional fields or sub-fields or may omit one or more fields or sub-fields.

FIG. 34 illustrates an aspect of a method 3400 for transmitting a packet. The method 3400 may be used to selectively generate the packets illustrated in FIGS. 7, 8, 9, 10, 11, 17-19, 22, 25, for example. The packet may be generated at the AP 104 or the STA 106 and transmitted to another node in the wireless network 100. Although the method 3400 is described below with respect to elements of the wireless device 202t, other components may be used to implement one or more of the steps.

At block 3402, a packet format is selected from at least two packet formats comprising a training field. In some aspects, the training field of one of the data packet formats includes a sequence repeated a greater number of times than in the training field of another of the data packet formats. In some aspects, the training field comprises an STF or LTF. The selection may be performed by the processor 204 and/or the DSP 220, for example.

At block 3404, a wireless communication is transmitted using the selected data packet format. The transmission may be performed by the transmitter 210, for example.

Figure 35:
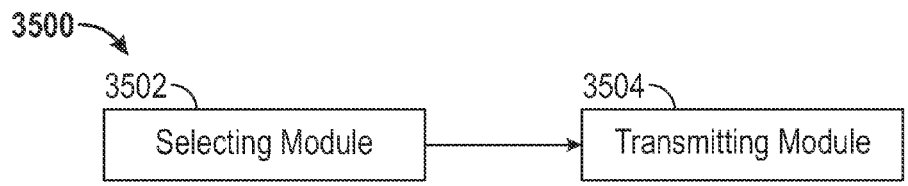
FIG. 35 is a functional block diagram of an example wireless device that may be employed within the wireless communication system of FIG. 1.

FIG. 35 is a functional block diagram of another example wireless device 3500 that may be employed within the wireless communication system 100 of FIG. 1. The device 3500 comprises a selecting module 3502 for selecting a data packet format from at least two data packet formats comprising a training field. The selecting module 3502 may be configured to perform one or more of the functions discussed above with respect to the block 3402 illustrated in FIG. 34. The selection module 3502 may correspond to one or more of the processor 204 and the DSP 220 of FIG. 2, for example. The device 3500 further comprises a transmitting module 3504 for transmitting a wireless communication using the selected packet format. The transmitting module 3504 may be configured to perform one or more of the functions discussed above with respect to the block 3404 illustrated in FIG. 34. The transmitting module 3504 may correspond to the transmitter 210 of FIG. 2, for example.

Figure 36:
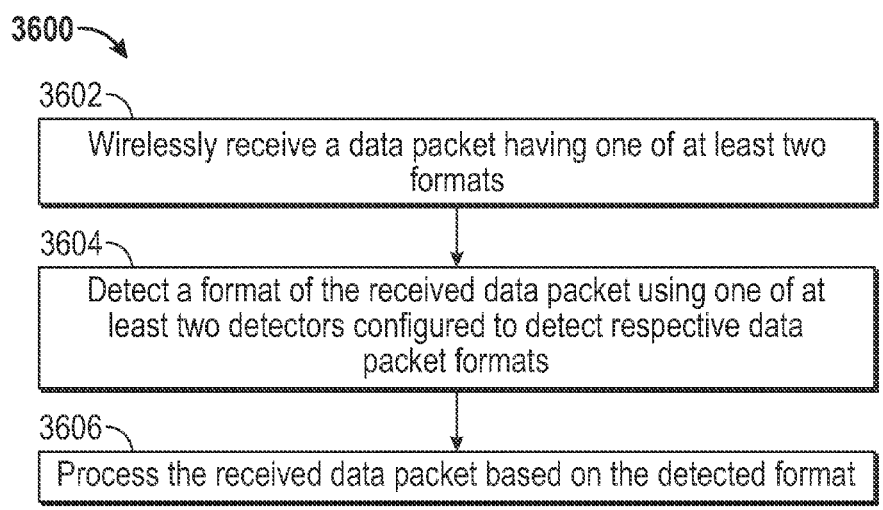
FIG. 36 illustrates an aspect of a method for receiving a packet.

FIG. 36 illustrates an aspect of a method 3600 for receiving and processing a packet. The method 3600 may be used to receive and process the packets illustrated in FIGS. 7, 8, 9, 10, 11, 17-19, 22, 25, for example. The packet may be received at the AP 104 or the STA 106 from another node in the wireless network 100 of FIG. 1. Although the method 3600 is described below with respect to elements of the wireless device 202r, other components may be used to implement one or more of the steps.

At block 3602, a packet having one of at least two formats is wirelessly received. The reception may be performed by the receiver 212, for example. At block 3604, a format of the packet is detected using one of at least two detectors configured to detect respective data packet formats. For example, the first detector 3202 and the second detector 3204 of the receiver 212 may be used to detect either the packet format 900 or the packet format 1100.

At block 3606, the received data packet is processed based on the detected format. The processing may be performed by the processor 204, the signal detector 218, and/or the DSP 220, for example.

Figure 37:
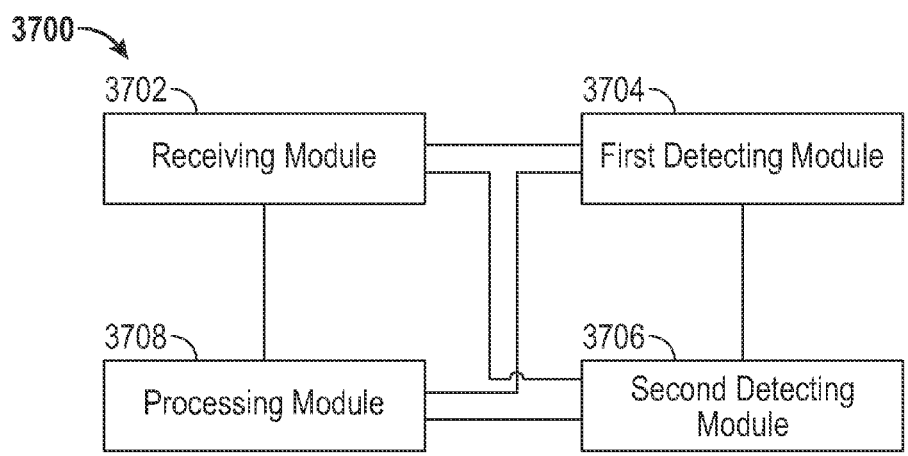
FIG. 37 is a functional block diagram of an example wireless device that may be employed within the wireless communication system of FIG. 1.

FIG. 37 is a functional block diagram of another example wireless device 3700 that may be employed within the wireless communication system 100. The device 3700 comprises a receiving module 3702 for wirelessly receiving a packet having one of at least two formats. The receiving module 3702 may be configured to perform one or more of the functions discussed above with respect to the block 3602 illustrated in FIG. 36. The receiving module 3702 may correspond to the receiver 212 of FIG. 2, for example. The device 3700 further comprises a first detecting module 3704 for detecting whether the received data packet has a first format. The first detecting module 3704 may be configured to perform one or more of the functions discussed above with respect to the block 3604 illustrated in FIG. 36. The first detecting module 3704 may correspond to the first detector 3202 in the receiver 212 of FIG. 32, for example. The device 3700 further comprises a second detecting module 3706 for detecting whether the received data packet has a second format. The second detecting module 3706 may be configured to perform one or more of the functions discussed above with respect to the block 3604 illustrated in FIG. 36. The second detecting module 3706 may correspond to the second detector 3204 in the receiver 212 of FIG. 32, for example. The device 3700 further comprises a processing module 3708 for processing the packet based on the first detecting module 3704 and the second detecting module 3706. The processing module 3708 may be configured to perform one or more of the functions discussed above with respect to the block 3606 illustrated in FIG. 36. The processing module 3708 may correspond to one or more of the processor 204, the signal detector 218, and the DSP 220 of FIG. 2, for example.

Figure 38:
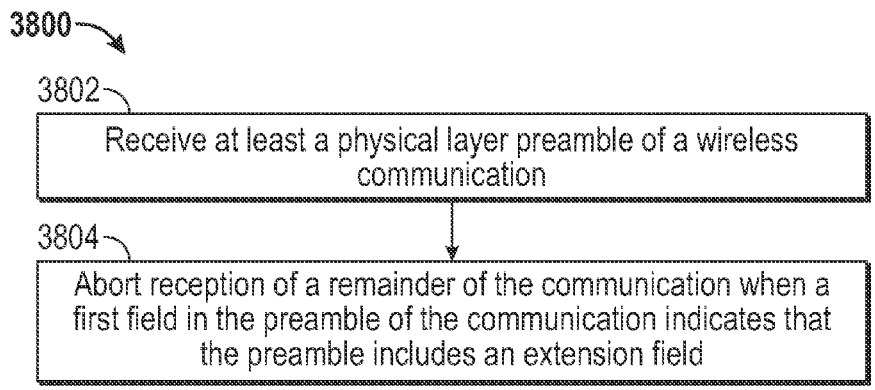
FIG. 38 illustrates an aspect of a method for receiving a portion of a packet.

FIG. 38 illustrates an aspect of a method 3800 for receiving a portion of a packet. The method 3800 may be used to receive a physical layer preamble of the packet and cease further processing of the packet after determining that the packet is not intended for the device that received the packet. The packet may be received at the AP 104 or the STA 106 from another node in the wireless network 100 of FIG. 1. Although the method 3800 is described below with respect to elements of the wireless device 202r, other components may be used to implement one or more of the steps.

At block 3802, at least the preamble of a packet is wirelessly received. The reception may be performed by the receiver 212, for example. In some aspects, the preamble includes a first field indicating whether the preamble also includes an extension field. The first field may comprise a SIG field, for example a SIG-A field. The inclusion of the extension field may be indicated, for example, by one or more bits in the SIG field, a BPSK rotation of the SIG field, and/or a bit on the Q-rail during a symbol of the SIG field. The extension field may comprise an extension SIG field and/or a SIG-B field. In some aspects, a plurality of extension fields may be included.

At block 3804, reception of a remainder of the packet is aborted when the first field indicates that the preamble includes the extension field. The aborting may be performed by the processor 204, the receiving 212, the signal detector 218, and/or the DSP 220, for example. In this way, power that may otherwise be used to fully receive and/or process the packet may be conserved.

Figure 39:
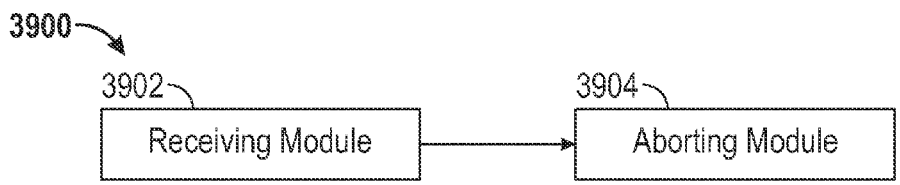
FIG. 39 is a functional block diagram of an example wireless device that may be employed within the wireless communication system of FIG. 1.

FIG. 39 is a functional block diagram of another example wireless device 3900 that may be employed within the wireless communication system 100. The device 3900 comprises a receiving module 3902 for wirelessly receiving at least a physical layer preamble of a wireless communication. In some aspects, the preamble includes a first field indicating whether the preamble also includes an extension field. The receiving module 3902 may be configured to perform one or more of the functions discussed above with respect to the block 3802 illustrated in FIG. 38. The receiving module 3902 may correspond to the receiver 212 of FIG. 2, for example. The device 3900 further comprises an aborting module 3904 for aborting reception of a remainder of the packet when the first field indicates that the preamble includes the extension field. The aborting module 3904 may be configured to perform one or more of the functions discussed above with respect to the block 3804 illustrated in FIG. 38. The aborting module 3904 may correspond to one or more of the processor 204, the receiver 212, the signal detector 218, and the DSP 220 of FIG. 2, for example.

Figure 40:
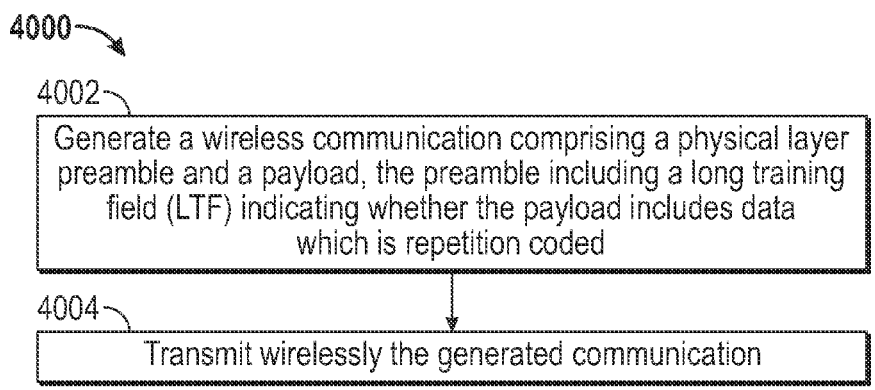
FIG. 40 illustrates an aspect of a method for transmitting a packet.

FIG. 40 illustrates an aspect of a method 4000 for transmitting a packet. The method 4000 may be used to generate the packets discussed in this disclosure, such as packets 2500 and 2550, for example. The packet may be generated at the AP 104 or the STA 106 and transmitted to another node in the wireless network 100. Although the method 4000 is described below with respect to elements of the wireless device 202t, other components may be used to implement one or more of the steps.

At block 4002, a wireless communication comprising a physical layer preamble and payload is generated. The preamble includes a LTF indicating whether the payload includes data which is repetition coded. For instance, the indication may be provided by symbol rotation of the LTF or a portion of the LTF. The generation may be performed by the processor 204 and/or the DSP 220, for example.

At block 4004, the generated communication is transmitted wirelessly. The transmission may be performed by the transmitter 210, for example.

Figure 41:
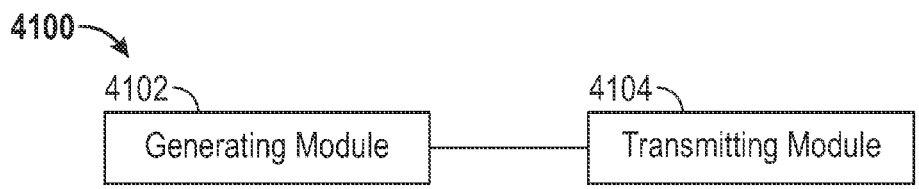
FIG. 41 is a functional block diagram of an example wireless device that may be employed within the wireless communication system of FIG. 1.

FIG. 41 is a functional block diagram of an example wireless device 4100 that may be employed within the wireless communication system of FIG. 1. The device 4100 comprises a generating module 4102 for generating a wireless communication including a physical layer preamble and a payload. The preamble may include a LTF indicating whether the payload includes data which is repetition coded. The generating module 4102 may be configured to perform one or more of the functions discussed above with respect to the block 4002 illustrated in FIG. 40. The generating module 4102 may correspond to one or more of the processor 204 and the DSP 220 of FIG. 2, for instance. The device 4100 further comprises a transmitting module 4104 for wirelessly transmitting the generated communication. The transmitting module 4104 may be configured to perform one or more of the functions discussed above with respect to the block 4004 illustrated in FIG. 40. The transmitting module 4104 may correspond to the transmitter 210 of FIG. 2, for instance.

Figure 42:
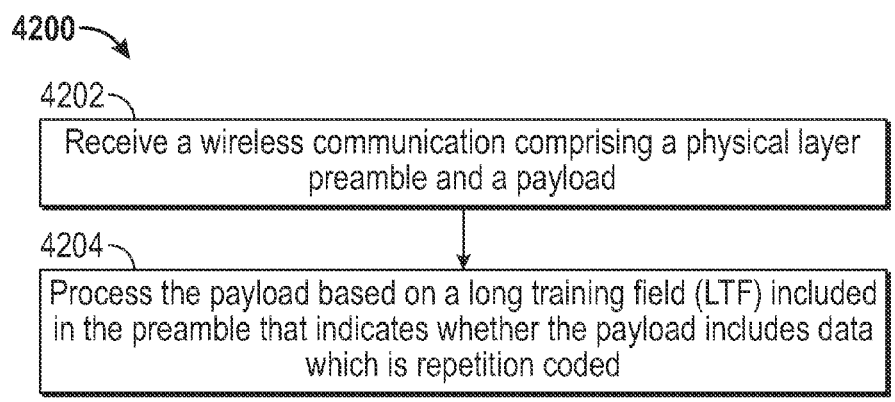
FIG. 42 illustrates an aspect of a method for receiving a portion of a packet.

FIG. 42 illustrates an aspect of a method 4200 for receiving a portion of a packet. The method 4200 may be used to receive and process the packets discussed in this disclosure, such as packets 2500 and 2550, for example. The packet may be received at either the AP 104 or the STA 106 from another node in the wireless network 100. Although the method 4200 is described below with respect to elements of the wireless device 202r, other components may be used to implement one or more of the steps.

At block 4202, a wireless communication comprising a physical layer preamble and a payload is received. The reception may be performed by the receiver 212, for example.

At block 4204, the payload is processed based on a LTF included in the preamble that indicates whether the payload includes data which is repetition coded. For instance, the indication may comprise a symbol rotation of the LTF or a portion of the LTF. The processing may be performed by the processor 204, the signal detector 218, and/or the DSP 220, for example.

Figure 43:
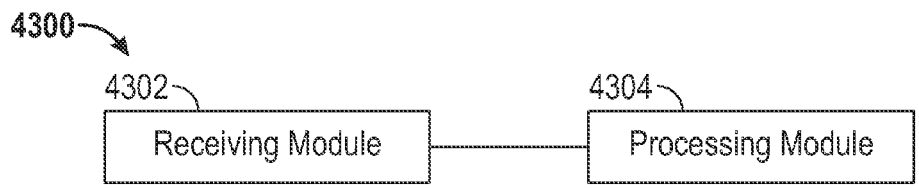
FIG. 43 is a functional block diagram of an example wireless device that may be employed within the wireless communication system of FIG. 1.

FIG. 43 is a functional block diagram of an example wireless device 4300 that may be employed within the wireless communication system of FIG. 1. The device 4300 comprises a receiving module 4302 for receiving a wireless communication comprising a physical layer preamble and a payload. The receiving module 4302 may be configured to perform one or more of the functions discussed above with respect to the block 4202 illustrated in FIG. 42. The receiving module 4302 may correspond to the receiver 212 of FIG. 2, for example. The device 4200 further comprises a processing module 4304 for processing the payload based on a LTF included in the preamble that indicates whether the payload includes data which is repetition coded. The processing module 4304 may be configured to perform one or more of the functions discussed above with respect to block 4204 illustrated in FIG. 42. The processing module 4304 may correspond to one or more of the processor 204, the signal detector 218, and the DSP 220 of FIG. 2, for example.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. An apparatus for wireless communication, comprising:
a receiver configured to wirelessly receive data packets having at least two formats, the receiver comprising a first detector configured to detect data packets of at least one of the two formats and a second detector configured to detect data packets of another of the two formats, the first detector and second detector operating in parallel; and
a processor configured to process a received data packet based at least in part on whether the received data packet was detected by the first detector or the second detector, the data packets of the at least one format and the data packets of the another format each comprising a signal field comprising a number of signal field symbols, the signal field of the at least one format being longer than the signal field of the another format, the data packets of the at least one format and the data packets of the another format each further comprising one or more training fields comprising a number of training field symbols, the number of signal field symbols of the signal field of the at least one format being greater than the number of signal field symbols of the signal field of the another format, and the number of training field symbols of the one or more training fields of the at least one format being greater than the number of training field symbols of the one or more training fields of the another format, and the signal field of the at least one format comprising a plurality of bits that is repeated four times.

2. The apparatus of claim 1, wherein the one or more training fields of each of the formats includes a first training field.

3. The apparatus of claim 2, wherein the first detector is configured to detect packets of the at least one format based at least in part on the first training field of the at least one format, and wherein the second detector is configured to detect packets of the another format based at least in part on the first training field of the another format.

4. The apparatus of claim 1, wherein the number of training field symbols of the at least one format are flipped with respect to the number of training field symbols of the another format.

5. The apparatus of claim 1, wherein data packets of one of the two formats include an extension field which comprises information for advanced features.

6. The apparatus of claim 5, wherein the advanced features include at least one of open loop multiple input multiple output transmission, low-density parity-check, single-user multiple input multiple output, use of a midamble, use of space-time block coding, and use of partial association identifier.

7. An apparatus for wireless communication, comprising:
a receiver configured to wirelessly receive data packets having at least two formats, the receiver comprising a first detector configured to detect data packets of at least one of the two formats and a second detector configured to detect data packets of another of the two formats; and
a processor configured to process a received data packet based at least in part on whether the received data packet was detected by the first detector or the second detector, the data packets of the at least one format and the data packets of the another format each comprising a signal field comprising a number of signal field symbols, the signal field of the at least one format being longer than the signal field of the another format, the data packets of the at least one format and the data packets of the another format each further comprising one or more training fields comprising a number of training field symbols, the number of signal field symbols of the signal field of the at least one format being greater than the number of signal field symbols of the signal field of the another format, and the number of training field symbols of the one or more training fields of the at least one format being greater than the number of training field symbols of the one or more training fields of the another format, and the signal field of the at least one format comprising a plurality of bits that is repeated four times.

8. The apparatus of claim 7, wherein the plurality of bits comprises nineteen bits.

9. An apparatus for wireless communication, comprising:
a receiver configured to wirelessly receive data packets having at least two formats, the receiver comprising a first detector configured to detect data packets of at least one of the two formats and a second detector configured to detect data packets of another of the two formats; and
a processor configured to process a received data packet based at least in part on whether the received data packet was detected by the first detector or the second detector, the data packets of the another format each including a payload and a preamble comprising a first 2-symbol training field, a second 2-symbol training field, and a 2-symbol signal field, and the data packets of the at least one format each including a payload and a preamble comprising a first 4-symbol training field, a second 4-symbol training field, and a 5-symbol or 6-symbol signal field.

10. A method of wireless communication, comprising:
wirelessly receiving a data packet having one of at least two formats;
detecting a format of the received data packet using one of at least two detectors configured to detect respective data packet formats, the at least two detectors operating in parallel; and
processing the received data packet based on the detected format, data packets having a first format of the two formats and data packets having a second format of the at least two formats each comprising a signal field comprising a number of signal field symbols, the signal field of the first format being longer than the signal field of the second format, the data packets of the at least one format and the data packets of the another format each further comprising one or more training fields comprising a number of training field symbols, the number of signal field symbols of the signal field of the at least one format being greater than the number of signal field symbols of the signal field of the another format, and the number of training field symbols of the one or more training fields of the at least one format being greater than the number of training field symbols of the one or more training fields of the another format, and the signal field of the first format comprising a plurality of bits that is repeated four times.

11. The method of claim 10, wherein the one or more training fields of each of the formats comprises includes a first training field.

12. The method of claim 11, wherein a first of the two detectors is configured to detect packets of the first format based at least in part on the first training field of the at least one format, and wherein a second of the two detectors is configured to detect packets of the second format based at least in part on the first training field of the another format.

13. The method of claim 10, wherein the number of training field symbols of the at least one format are flipped with respect to the number of training field symbols of the another format.

14. The method of claim 10, wherein data packets of one of the two formats include an extension field which comprises information for advanced features.

15. The method of claim 14, wherein the advanced features include at least one of open loop multiple input multiple output transmission, low-density parity-check, single-user multiple input multiple output, use of a midamble, use of space-time block coding, and use of partial association identifier.

16. A method of wireless communication, comprising:
wirelessly receiving a data packet having one of at least two formats;
detecting a format of the received data packet using one of at least two detectors configured to detect respective data packet formats; and
processing the received data packet based on the detected format, data packets having a first format of the two formats and data packets having a second format of the at least two formats each comprising a signal field comprising a number of signal field symbols, the signal field of the at least one format being longer than the signal field of the another format, the data packets of the at least one format and the data packets of the another format each further comprising one or more training fields comprising a number of training field symbols, the number of signal field symbols of the signal field of the at least one format being greater than the number of signal field symbols of the signal field of the another format, and the number of training field symbols of the one or more training fields of the at least one format being greater than the number of training field symbols of the one or more training fields of the another format, and the signal field of the first format comprising a plurality of bits that is repeated four times.

17. The method of claim 16, wherein the plurality of bits comprises nineteen bits.

18. A method of wireless communication, comprising:
wirelessly receiving a data packet having one of at least two formats;
detecting a format of the received data packet using one of at least two detectors configured to detect respective data packet formats; and
processing the received data packet based on the detected format, the data packets of a second format each including a payload and a preamble comprising a first 2-symbol training field, a second 2-symbol training field, and a 2-symbol signal field, and the data packets of a first format each including a payload and a preamble comprising a first 4-symbol training field, a second 4-symbol training field, and a 5-symbol or 6-symbol signal field.

19. An apparatus for wireless communication, comprising:
means for wirelessly receiving a data packet having one of at least two formats;
first means for detecting whether the received data packet has a first format;
second means for detecting whether the received data packet has a second format, the first and second means occurring in parallel; and
means for processing the received data packet based on the first detecting means and the second detecting means, the data packet of the first format and the data packet of the second format each comprising a signal field comprising a number of signal field symbols, the signal field of the at least one format being longer than the signal field of the another format, the data packets of the at least one format and the data packets of the another format each further comprising one or more training fields comprising a number of training field symbols, the number of signal field symbols of the signal field of the at least one format being greater than the number of signal field symbols of the signal field of the another format, and the number of training field symbols of the one or more training fields of the at least one format being greater than the number of training field symbols of the one or more training fields of the another format, and the signal field of the at least one format comprising a plurality of bits that is repeated four times.

20. A non-transitory computer readable medium comprising instructions that when executed cause an apparatus to:
wirelessly receive a data packet having one of at least two formats;
detect a format of the received data packet using one of at least two detectors configured to detect data packets of at least one of the two formats and another of the two formats, the at least two detectors operating in parallel; and
process the received data packet based on the detected format, the data packets of the at least one format and the data packets of the another format each comprising a signal field comprising a number of signal field symbols, the signal field of the at least one format being longer than the signal field of the another format, the data packets of the at least one format and the data packets of the another format each further comprising one or more training fields comprising a number of training field symbols, the number of signal field symbols of the signal field of the at least one format being greater than the number of signal field symbols of the signal field of the another format, and the number of training field symbols of the one or more training fields of the at least one format being greater than the number of training field symbols of the one or more training fields of the another format, and the signal field of the at least one format comprising a plurality of bits that is repeated four times.

21. An apparatus for wireless communication, comprising:
a processor configured to select a data packet format from at least two data packet formats comprising a training field comprising a number of training field symbols, the at least two data packet formats further comprising a signal field comprising a number of signal field symbols, the training field of one of the data packet formats including a sequence repeated a greater number of times than in the training field of another of the data packet formats, the number of signal field symbols of the signal field of the one format being greater than the number of signal field symbols of the signal field of the another format, and the number of training field symbols of the one or more training fields of the one format being greater than the number of training field symbols of the one or more training fields of the another format, and the signal field of the one format comprising a plurality of bits that is repeated four times; and
a transmitter configured to transmit a wireless communication using the selected data packet format.

22. The apparatus of claim 21, wherein the one or more training fields of each of the formats includes a first training field.

23. The apparatus of claim 21, wherein a portion of the one or more training fields of the one format is flipped with respect to a portion of the one or more training fields of the another format.

24. The apparatus of claim 21, wherein the plurality of bits comprises nineteen bits.

25. The apparatus of claim 21, wherein the data packets of the another format each include a payload and a preamble comprising a first 2-symbol training field, a second 2-symbol training field, and a 2-symbol signal field, and the data packets of the one format each include a payload and a preamble comprising a first 4-symbol training field, a second 4-symbol training field, and a 5-symbol or 6-symbol signal field.

26. The apparatus of claim 21, wherein data packets of one of the two formats include an extension field which comprises information for advanced features.

27. The apparatus of claim 26, wherein the advanced features include at least one of open loop multiple input multiple output transmission, low-density parity-check, single-user multiple input multiple output, use of a midamble, use of space-time block coding, and use of partial association identifier.

28. A method of wireless communication, comprising:
selecting a data packet format from at least two data packet formats comprising a training field comprising a number of training field symbols, the at least two data packet formats further comprising a signal field comprising a number of signal field symbols, the training field of one of the data packet formats including a sequence repeated a greater number of times than in the training field of another of the data packet formats, the number of signal field symbols of the signal field of the one format being greater than the number of signal field symbols of the signal field of the another format, and the number of training field symbols of the one or more training fields of the one format being greater than the number of training field symbols of the one or more training fields of the another format, and the signal field of the one format comprising a plurality of bits that is repeated four times; and
transmitting a wireless communication using the selected data packet format.

29. The method of claim 28, wherein the one or more training fields of each of the formats includes a first training field.

30. The method of claim 28, wherein a portion of the one or more training fields of the one format is flipped with respect to a portion of the one or more training fields of the another format.

31. The method of claim 28, wherein the plurality of bits comprises nineteen bits.

32. The method of claim 28, wherein the data packets of the another format each include a payload and a preamble comprising a first 2-symbol training field, a second 2-symbol training field, and a 2-symbol signal field, and the data packets of the one format each include a payload and a preamble comprising a first 4-symbol training field, a second 4-symbol training field, and a 5-symbol or 6-symbol signal field.

33. The method of claim 28, wherein data packets of one of the two formats include an extension field which comprises information for advanced features.

34. The method of claim 33, wherein the advanced features include at least one of open loop multiple input multiple output transmission, low-density parity-check, single-user multiple input multiple output, use of a midamble, use of space-time block coding, and use of partial association identifier.

35. An apparatus for wireless communication, comprising:
means for selecting a data packet format from at least two data packet formats comprising a training field comprising a number of training field symbols, the at least two data packet formats further comprising a signal field comprising a number of signal field symbols, the training field of one of the data packet formats including a sequence repeated a greater number of times than in the training field of another of the data packet formats, the number of signal field symbols of the signal field of the one format being greater than the number of signal field symbols of the signal field of the another format, and the number of training field symbols of the one or more training fields of the one format being greater than the number of training field symbols of the one or more training fields of the another format, and the signal field of the one format comprising a plurality of bits that is repeated four times; and
means for transmitting a wireless communication using the selected data packet format.

36. A non-transitory computer readable medium comprising instructions that when executed cause an apparatus to:
select a data packet format from at least two data packet formats comprising a training field comprising a number of training field symbols, the at least two data packet formats further comprising a signal field comprising a number of signal field symbols, the training field of one of the data packet formats including a sequence repeated a greater number of times than in the training field of another of the data packet formats, the number of signal field symbols of the signal field of the one format being greater than the number of signal field symbols of the signal field of the another format, and the number of training field symbols of the one or more training fields of the one format being greater than the number of training field symbols of the one or more training fields of the another format, and the signal field of the one format comprising a plurality of bits that is repeated four times; and transmit a wireless communication using the selected data packet format.

* * * * *